United States Patent
Sasagawa

(10) Patent No.: US 9,939,863 B2
(45) Date of Patent: Apr. 10, 2018

(54) POWER CONTROL SYSTEM AND STORAGE SYSTEM

(71) Applicant: TOSHIBA MEMORY CORPORATION, Minato-ku (JP)

(72) Inventor: Hiroshi Sasagawa, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 260 days.

(21) Appl. No.: 14/573,029

(22) Filed: Dec. 17, 2014

(65) Prior Publication Data

US 2016/0109917 A1   Apr. 21, 2016

Related U.S. Application Data

(60) Provisional application No. 62/065,401, filed on Oct. 17, 2014.

(51) Int. Cl.
| | |
|---|---|
| *G06F 1/26* | (2006.01) |
| *G06F 1/32* | (2006.01) |
| *G06F 13/40* | (2006.01) |

(52) U.S. Cl.
CPC .............. *G06F 1/266* (2013.01); *G06F 1/324* (2013.01); *G06F 1/3268* (2013.01); *G06F 1/26* (2013.01); *G06F 13/4081* (2013.01)

(58) Field of Classification Search
CPC ........ G06F 1/26; G06F 1/266; G06F 13/4081; G06F 1/324; G06F 1/3268
USPC ................ 713/300, 310; 710/302; 714/2, 3
See application file for complete search history.

(56) References Cited

U.S. PATENT DOCUMENTS

| | | | |
|---|---|---|---|
| 5,371,743 A | 12/1994 | Deyesso et al. | |
| 6,801,973 B2 | 10/2004 | Wu | |
| 7,616,517 B1* | 11/2009 | Habel | G11C 5/144 365/227 |
| 8,082,383 B2* | 12/2011 | Suzuki | G11C 16/06 711/103 |
| 2003/0204658 A1 | 10/2003 | Wu | |
| 2004/0078508 A1* | 4/2004 | Rivard | G06F 11/2089 711/4 |
| 2005/0218952 A1* | 10/2005 | Padhye | G11C 5/147 327/218 |
| 2007/0079148 A1* | 4/2007 | Pastorello | G06F 1/3203 713/300 |
| 2013/0031397 A1* | 1/2013 | Abe | G06F 1/3225 713/324 |

FOREIGN PATENT DOCUMENTS

| | | |
|---|---|---|
| JP | 6-139092 | 5/1994 |
| JP | 2540432 | 7/1996 |

(Continued)

*Primary Examiner* — Ji H Bae
(74) *Attorney, Agent, or Firm* — Oblon, McClelland, Maier & Neustadt, L.L.P.

(57) ABSTRACT

According to one embodiment, a power control system includes a power controlled unit, a first power controller configured to generate a first control signal that controls the power of the power controlled unit, and a second power controller including a signal holding unit configured to hold the first control signal and to transmit a second control signal including information identical to the information of the first control signal to the power controlled unit, the second power controller being different from the first power controller as hardware.

19 Claims, 28 Drawing Sheets

(56) References Cited

FOREIGN PATENT DOCUMENTS

| | | |
|---|---|---|
| JP | 9-160675 | 6/1997 |
| JP | 2738374 | 1/1998 |
| JP | 11-184572 | 7/1999 |

* cited by examiner

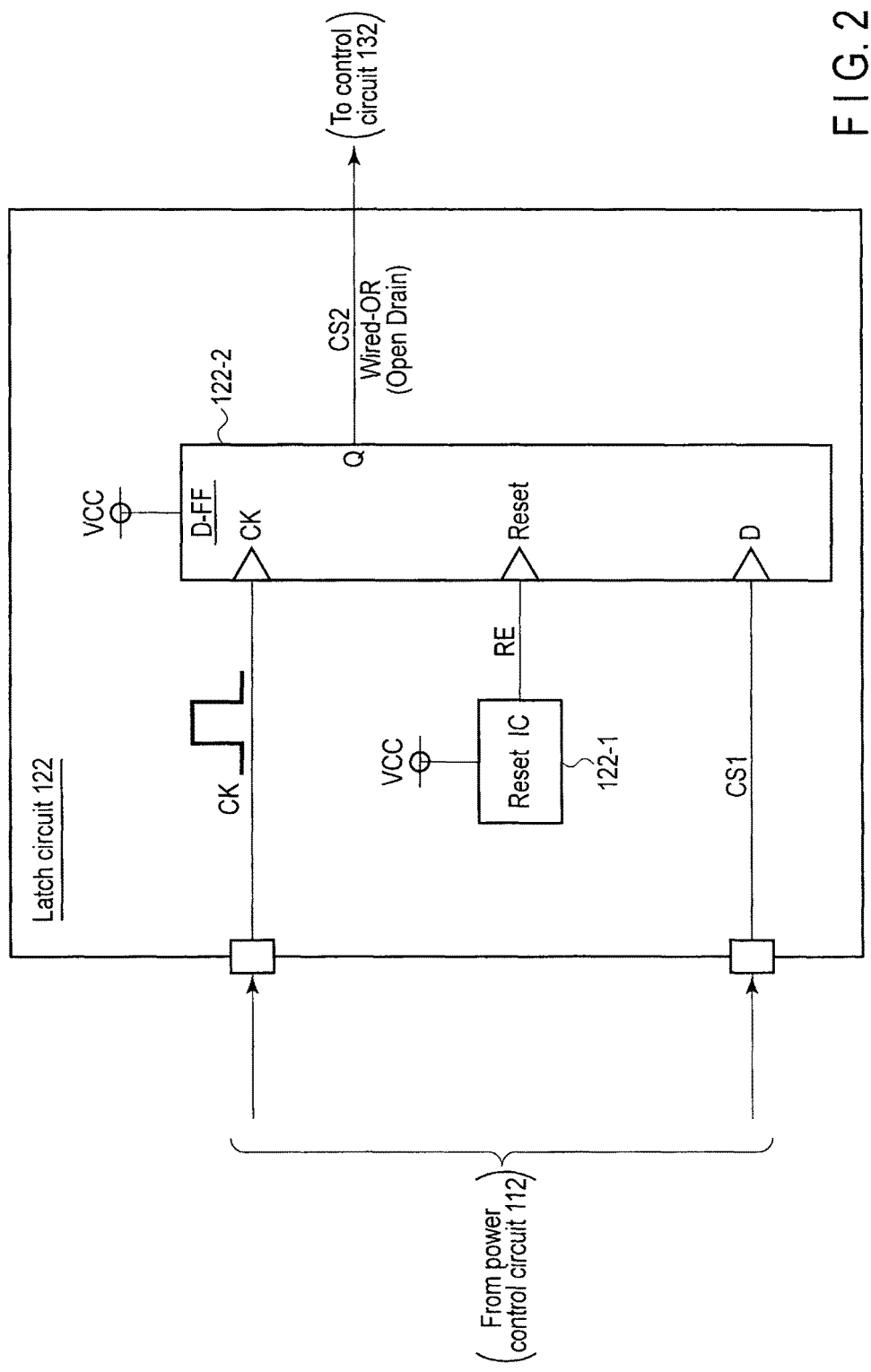
F I G. 2

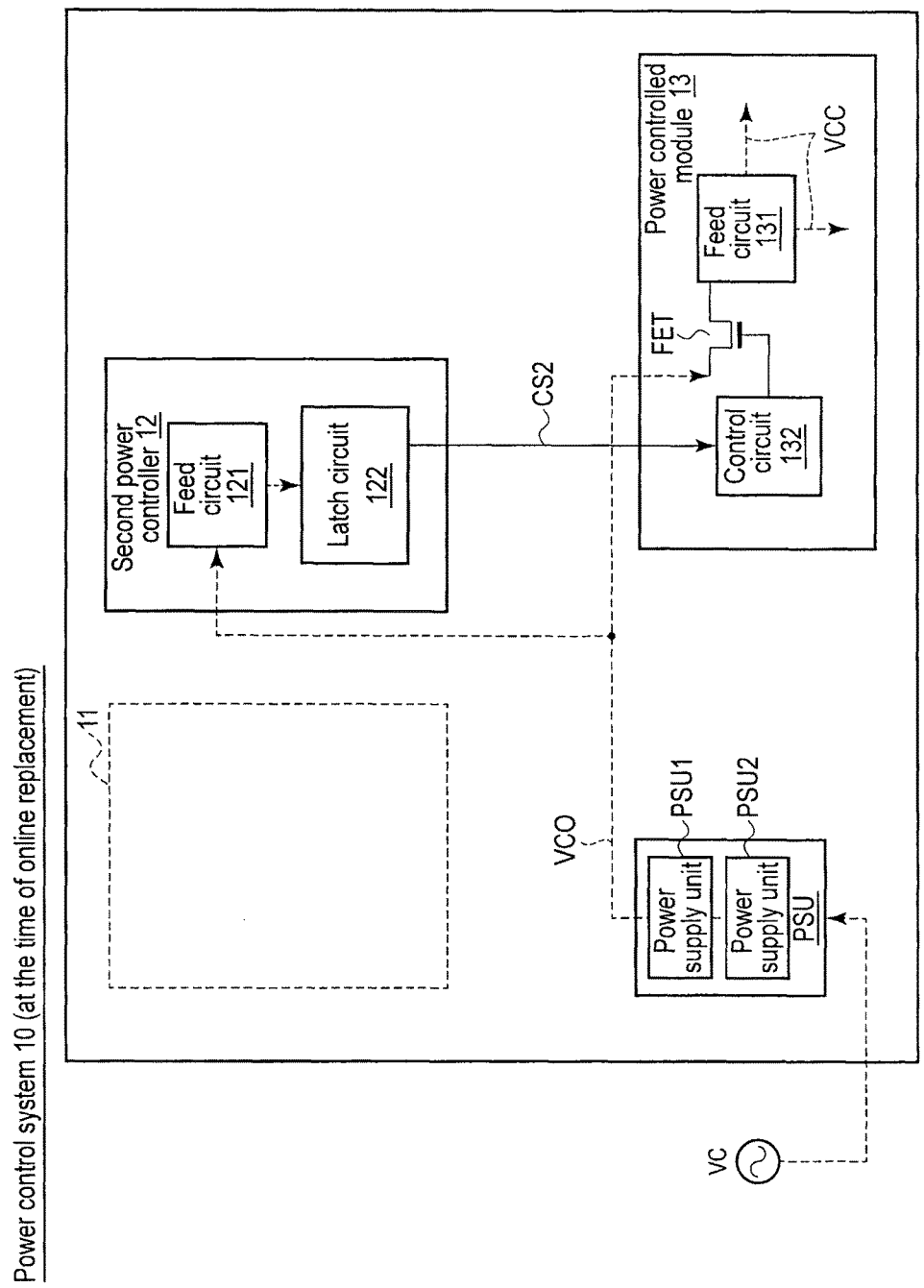
F I G. 4

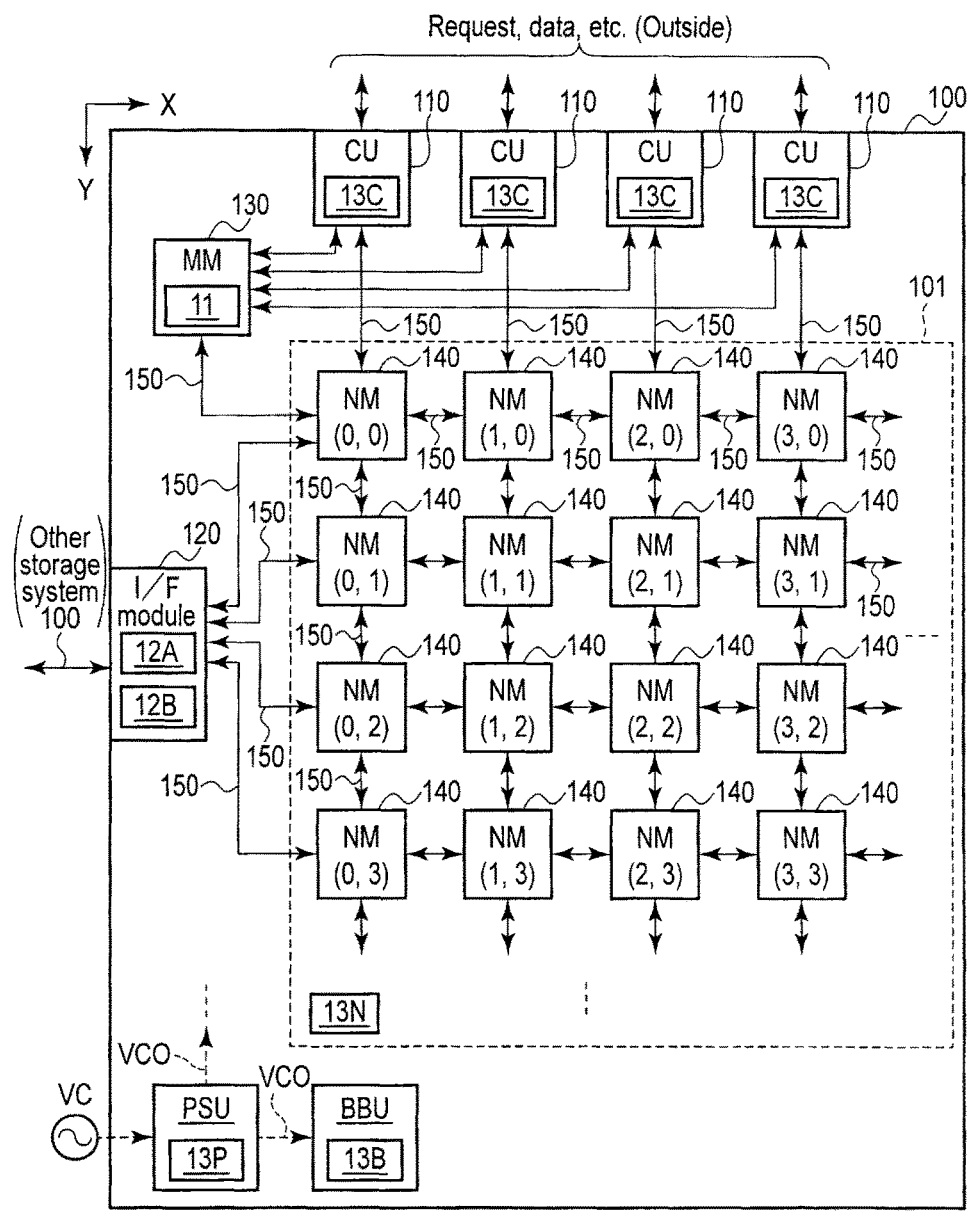
F I G. 8

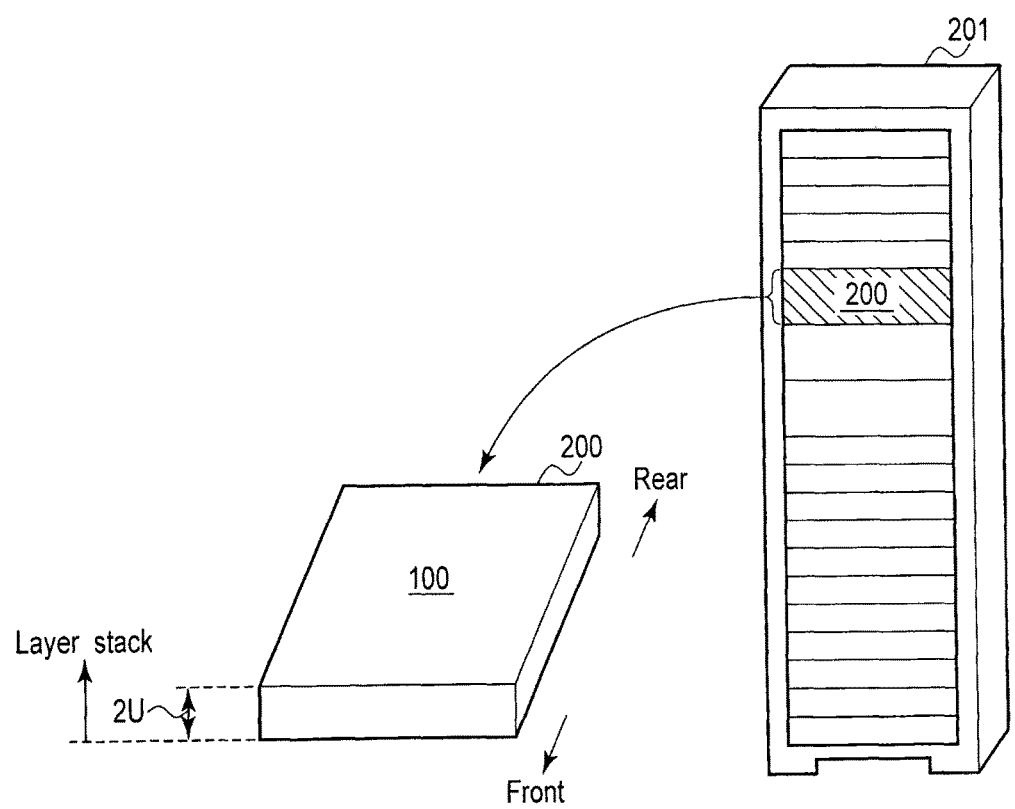
F I G. 13

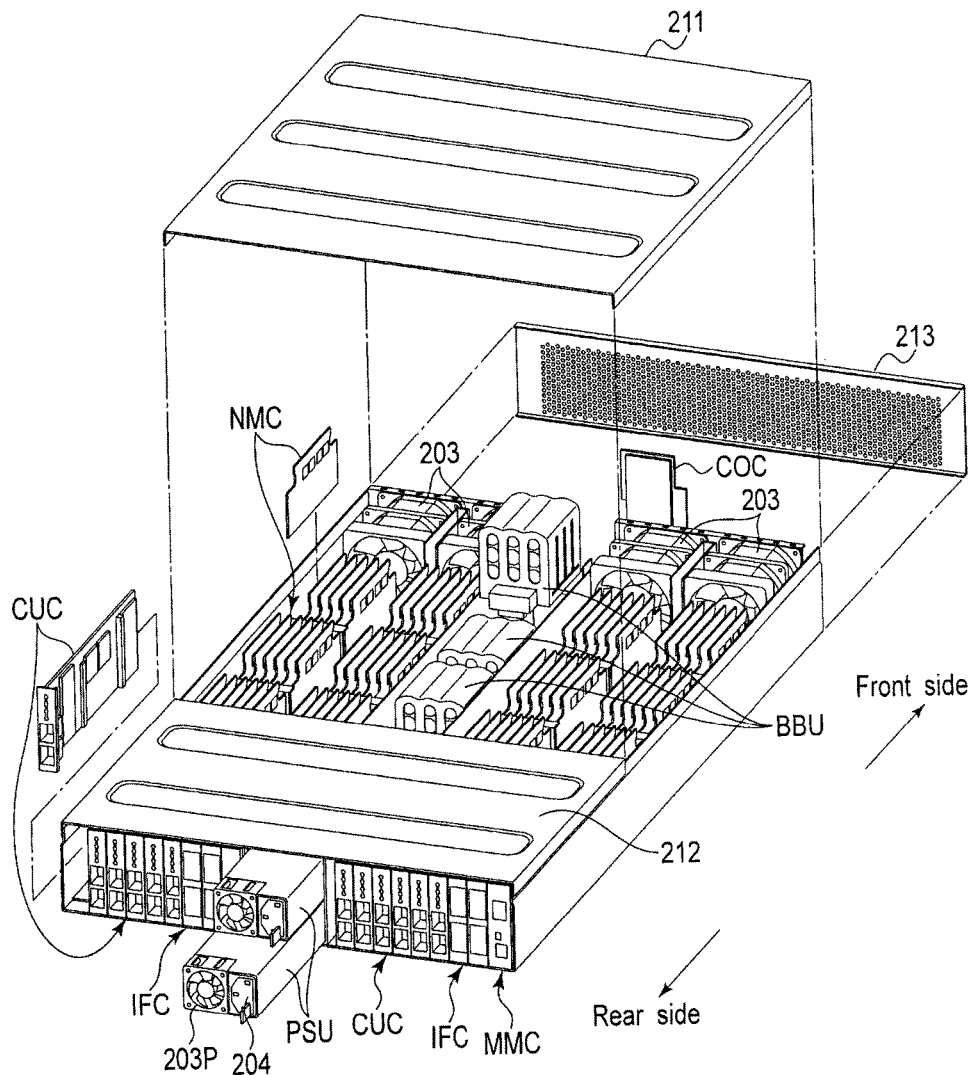
F I G. 14

Enclosure 200 (Front side)
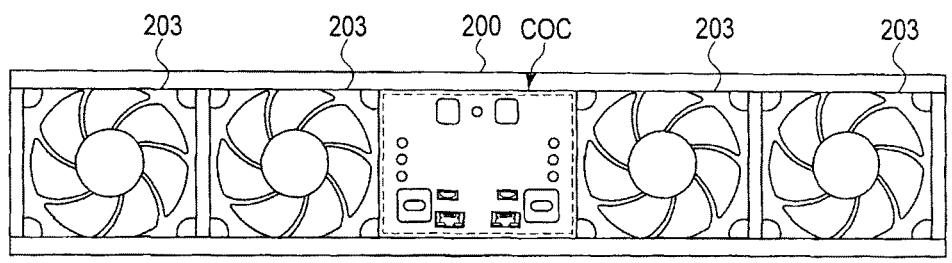
F I G. 15
Enclosure 200 (Rear side)
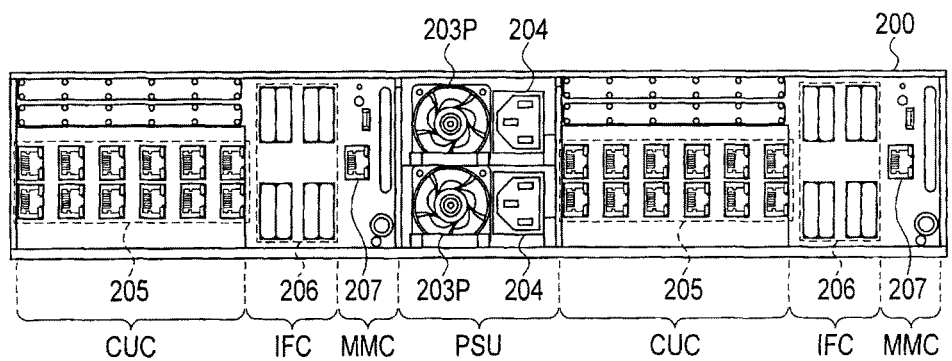
F I G. 16

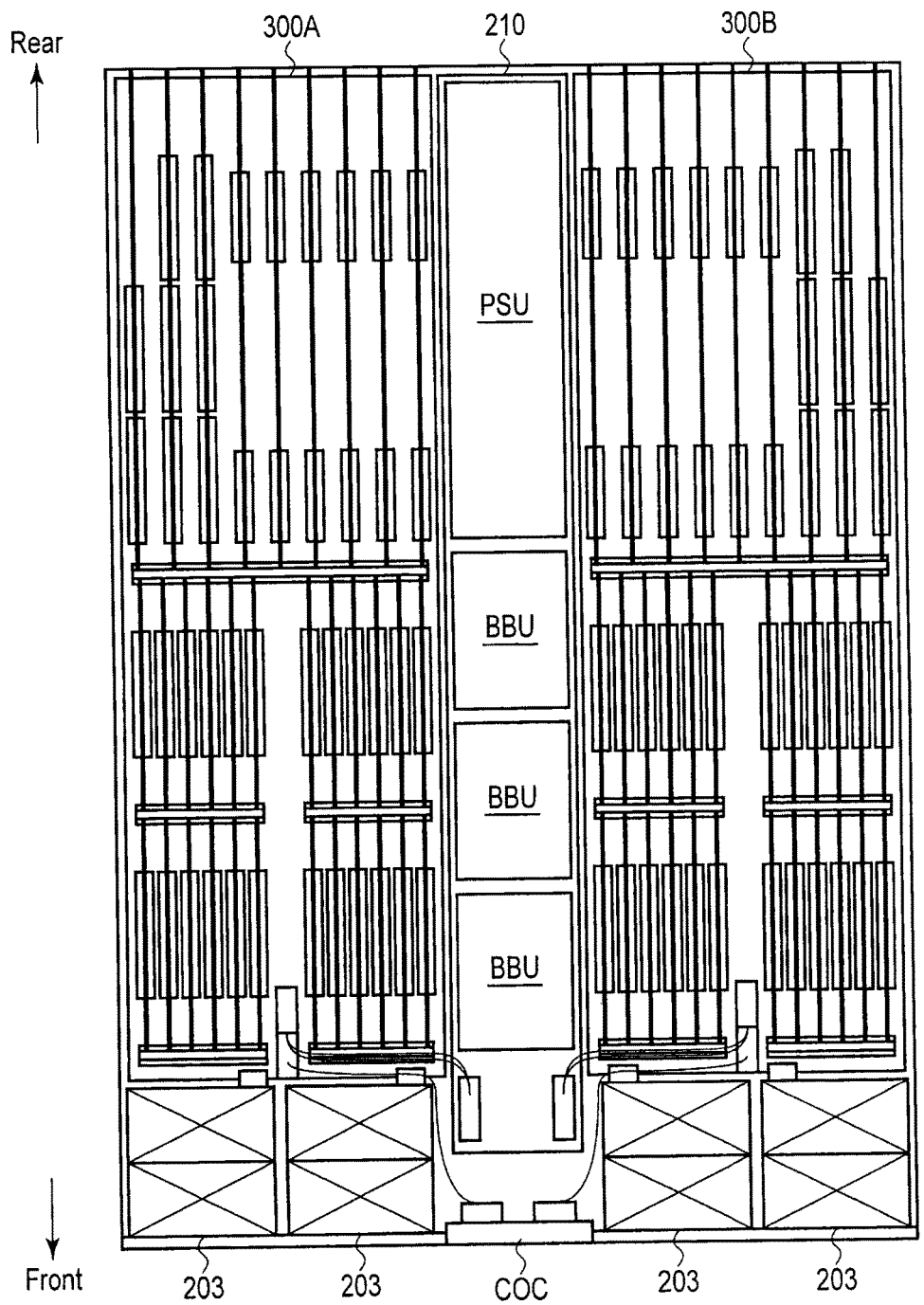
F I G. 17

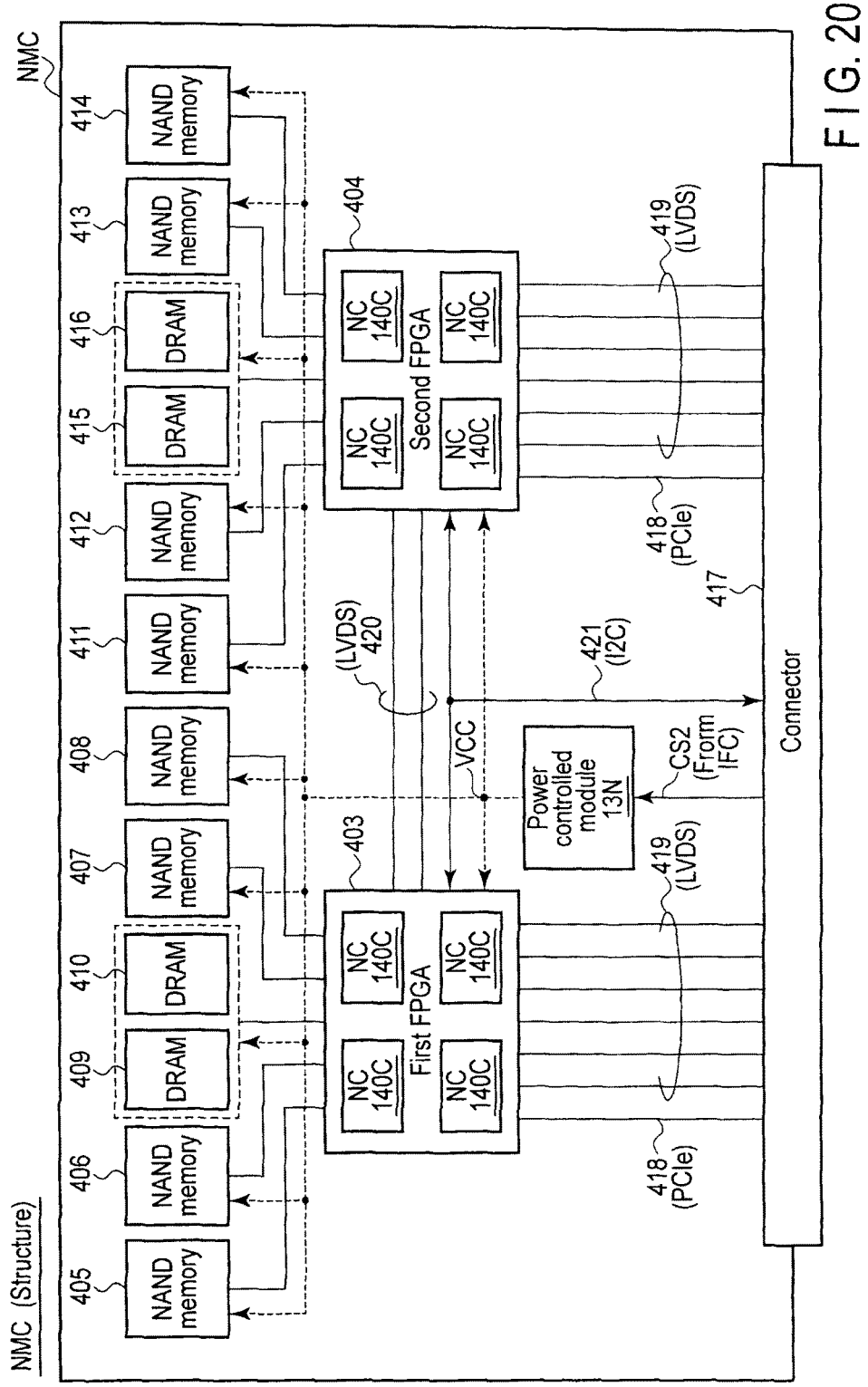
F I G. 20

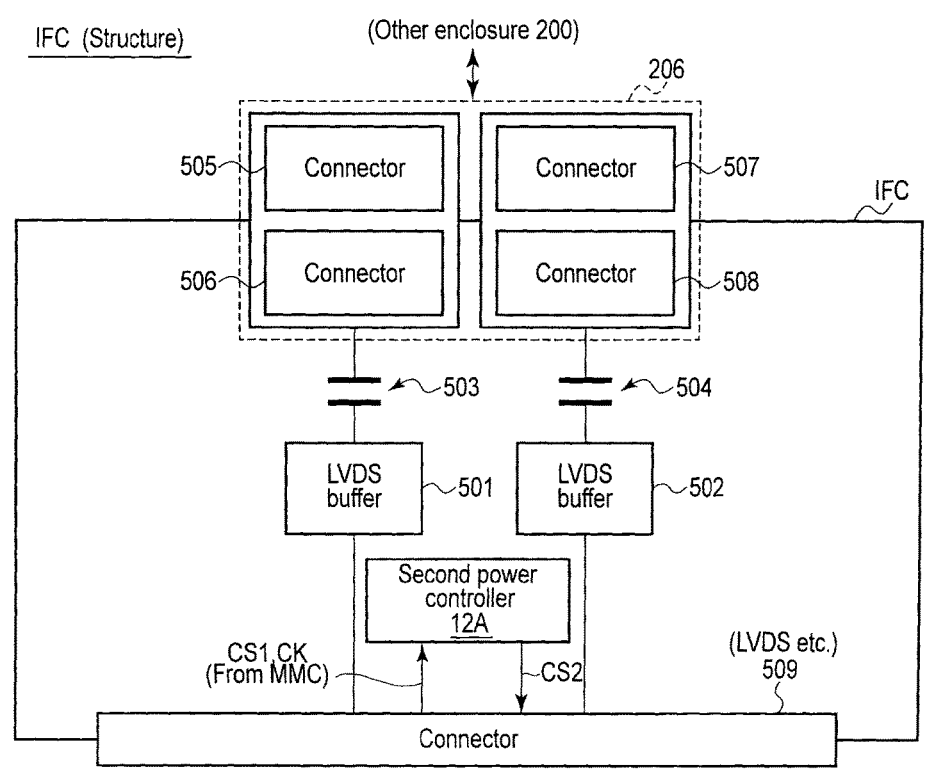
F I G. 24

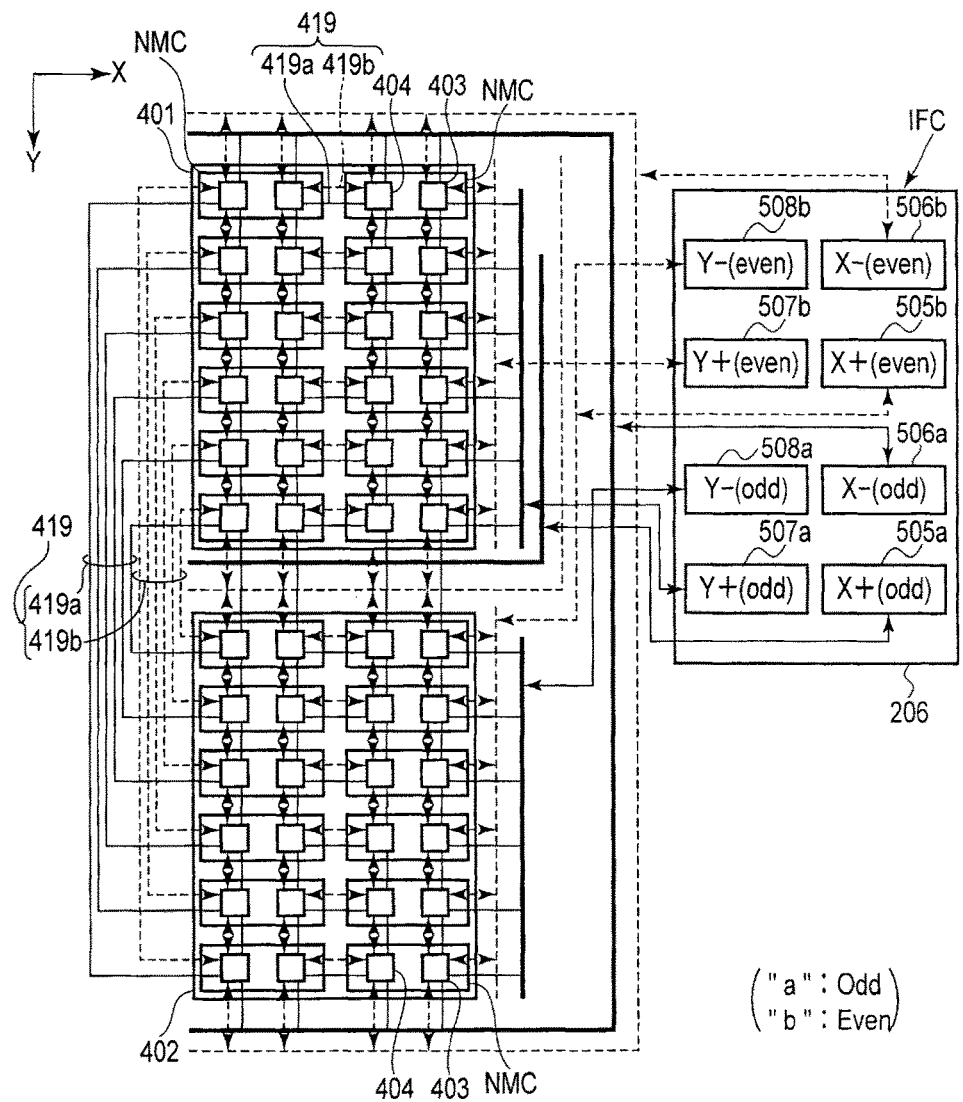
F I G. 25

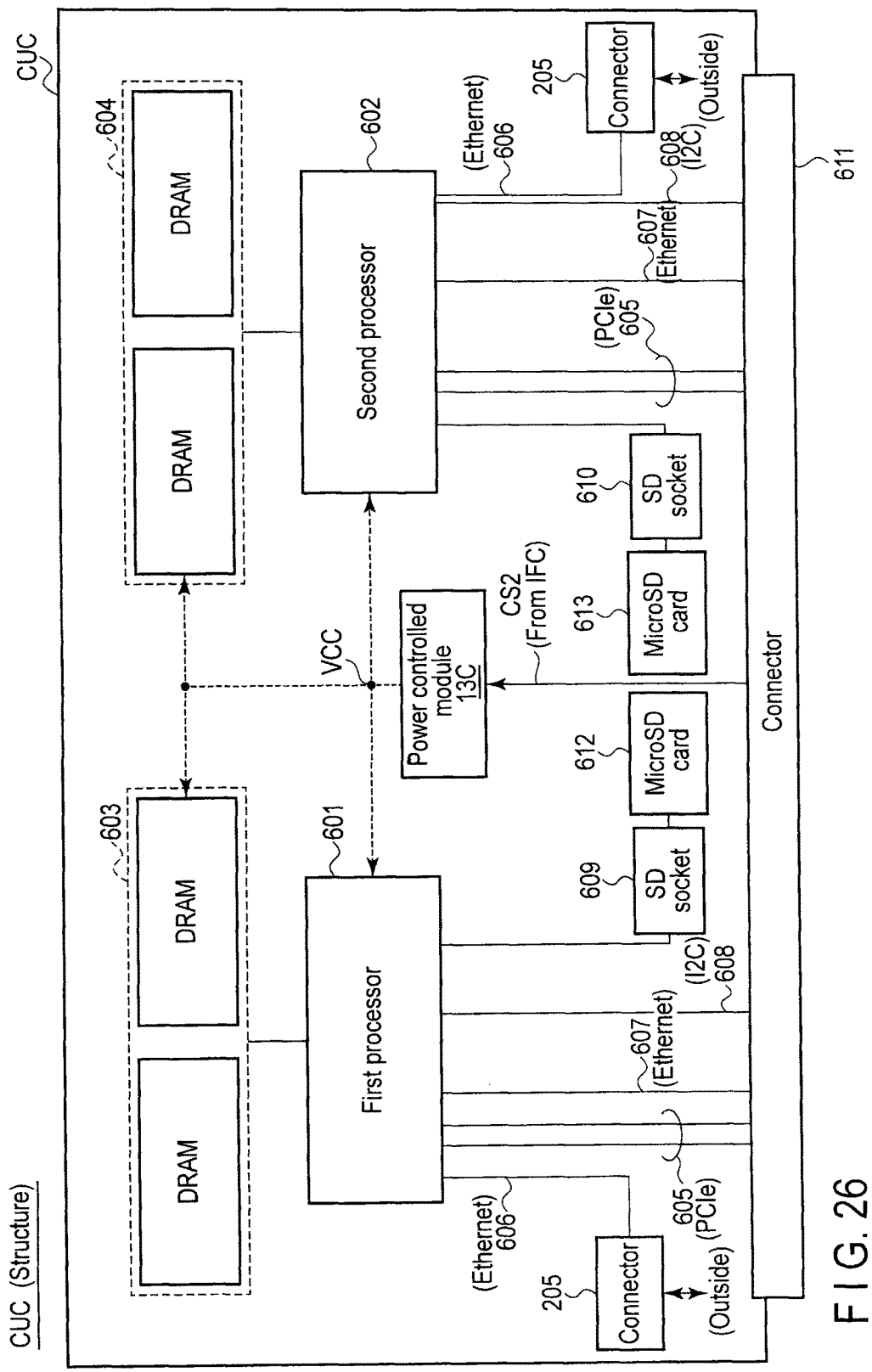
F I G. 26

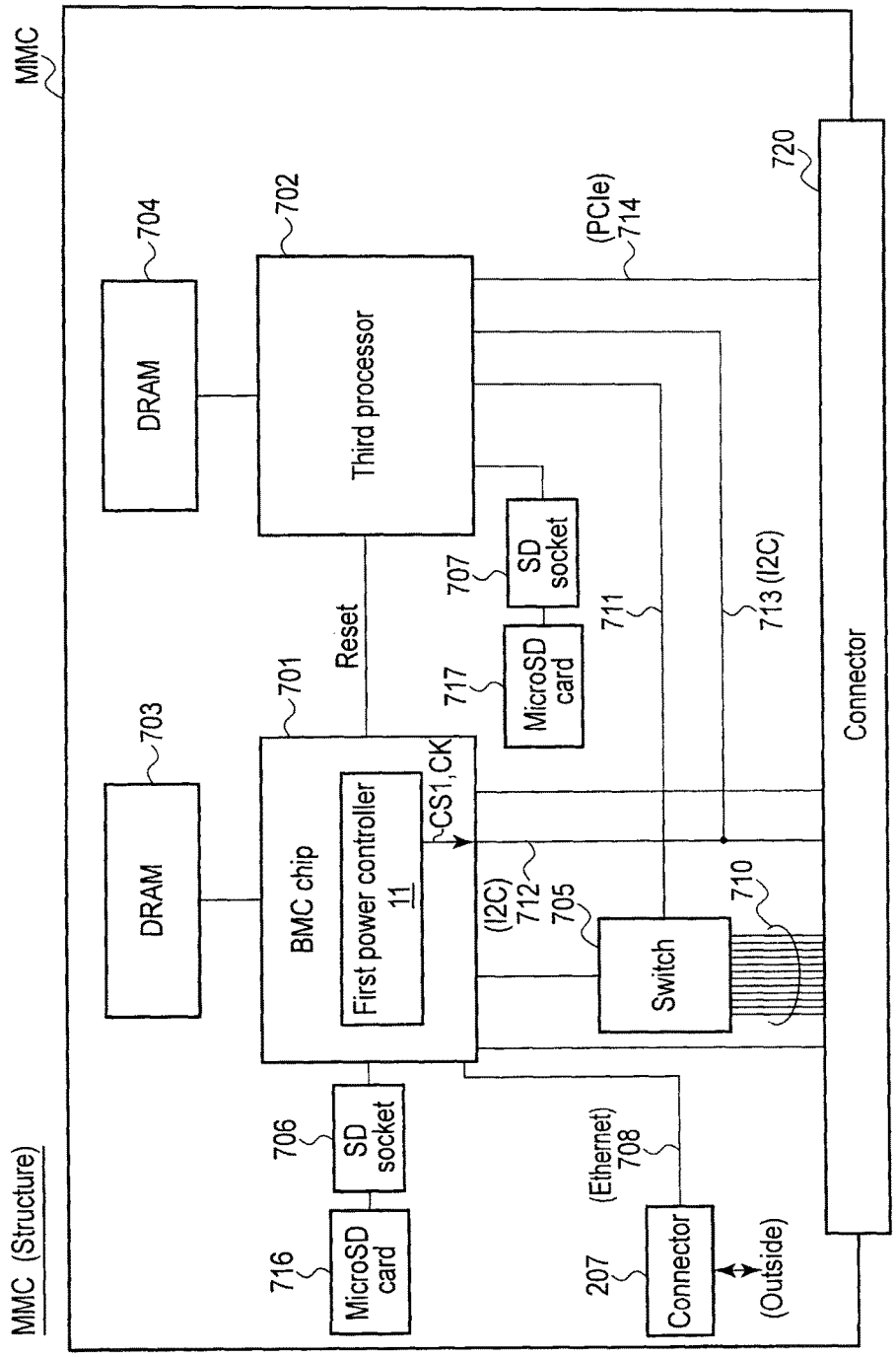
F I G. 27

Connection relationship between CUC and MMC

Enclosure (first connection example)

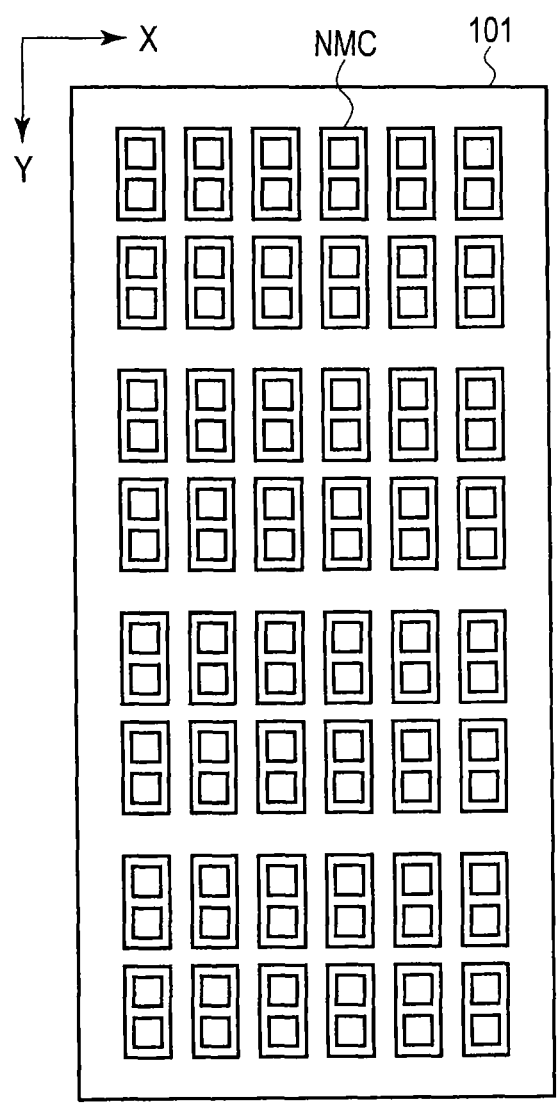
F I G. 32

US 9,939,863 B2

POWER CONTROL SYSTEM AND STORAGE SYSTEM

CROSS-REFERENCE TO RELATED APPLICATIONS

This application claims the benefit of U.S. Provisional Application No. 62/065,401, filed Oct. 17, 2014, the entire contents of which are incorporated herein by reference.

FIELD

Embodiments described herein relate generally to a power control system and a storage system.

BACKGROUND

A plurality of information processors including a storage system are sometimes mutually connected by a network to constitute an information processing system. For example, a cloud computing system can be cited as an example of such the information processing system. Recently, data such as cloud data in the information processing system tends to be increasingly used.

BRIEF DESCRIPTION OF THE DRAWINGS

FIG. 2 is an equivalency circuit diagram showing an example of a latch circuit in FIG. 1.

FIG. 4 is a block diagram showing the power control system according to the first embodiment at the time of online replacement.

FIG. 8 is a block diagram showing a storage system according to a third embodiment.

FIG. 13 is a perspective view showing a server rack which can mount an enclosure containing a memory system according to the third embodiment.

FIG. 14 is a perspective view showing the enclosure in which a storage system according to the third embodiment is contained.

FIG. 15 is a front view of the enclosure.

FIG. 16 is a back view of the enclosure.

FIG. 17 is a top view of the inside of the enclosure.

FIG. 20 is a block diagram showing an example of a structure of an NM card.

FIG. 24 is a block diagram showing an example of a structure of an interface card.

FIG. 25 shows a connection relationship between the NM card and the interface card.

FIG. 26 is a block diagram showing an example of a structure of a CU card.

FIG. 27 is a block diagram showing an example of a structure of an MM card.

FIG. 32 shows a storage logically constructed by the first connection example.

DETAILED DESCRIPTION

Figure 1:
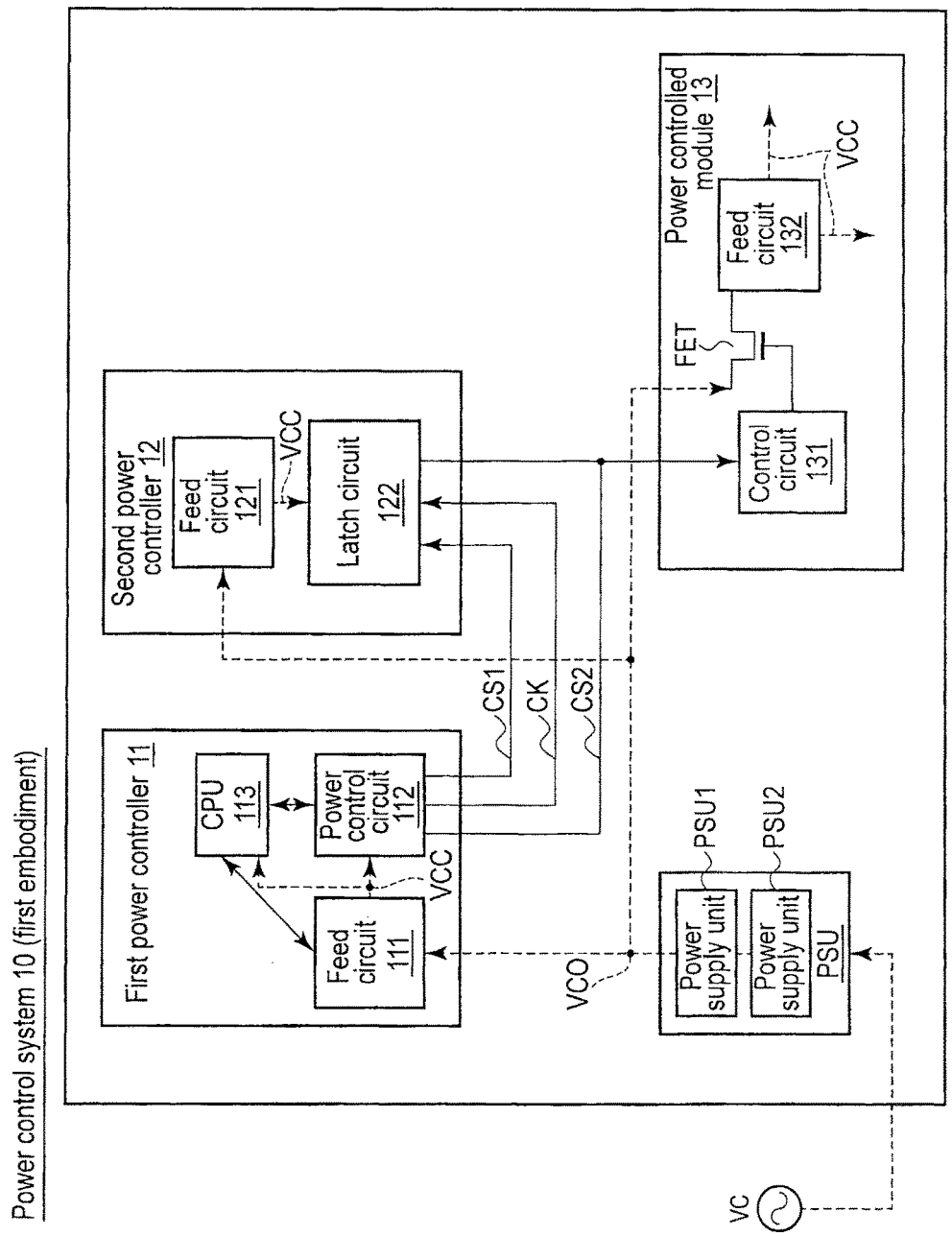
FIG. 1 is a block diagram showing a power control system according to a first embodiment.

Various embodiments will be described hereinafter with reference to the accompanying drawings. In the following description, substantially identical functions and components will be denoted by the same reference numerals, and described as necessary. Further, in this specification, some components are expressed by two or more terms. These terms are merely examples. The components may be further expressed by another or other terms. The other components which are not expressed by two or more terms may be expressed by another or other terms.

Furthermore, the drawings are schematic ones, and may be different from actual things in relationship between a thickness and a planar size or in ratio of a thickness of each of layers. In addition, a portion in which a relationship or ratio of size is different between the drawings may be present.

In general, according to one embodiment, a power control system includes a power controlled unit in which a power supply is controlled, a first power controller configured to generate a first control signal that controls the power supply of the power controlled unit, a second power controller including a signal holding unit configured to hold the first control signal and to transmit a second control signal that is information identical to the information of the first control signal to the power controlled unit, the second power controller being different from the first power controller as hardware, and a storage module including a plurality of memory units, at least one memory unit including a non-volatile memory and a controller configured to control data transfer of the non-volatile memory.

First Embodiment

[Structure (Power Control System)]

First, a structure of a power control system 10 according to a first embodiment will be described with reference to FIG. 1. In FIG. 1, an arrow indicated by a broken line represents a route of a power voltage system, and an arrow indicated by a solid line represents a route of a signal system.

As shown in the figure, the power control system 10 according to the first embodiment includes a power supply unit PSU, a first power controller 11, a second power controller 12 and a power controlled module 13.

[Power Supply Unit]

The power supply unit PSU converts external power voltage applied from an external power source VC into a predetermined power voltage, and supplies converted power voltage VCO to each of components (11 to 13). The external power source VC is, for example, an AC source of 100 V, 200 V or the like. The power supply unit PSU according to the first embodiment includes two power supply units PSU-1 and PSU-2. However, the structure of the power supply unit PSU is not limited to this.

[First Power Controller]

The first power controller (first control module, first power control circuit) 11 transmits control signal CS1 and a clock signal CK to the second power controller 12 based on a state of a power source of the power controlled module 13, and causes the second power controller 12 to latch (hold) control signal CS1. Further, the first power controller 11 transmits control signal CS2 having a value similar to that of control signal CS1 to the power controlled module 13 at timing of rising of the clock signal CK.

More specifically, the first power controller 11 detects the state of the power source of the power controlled module 13, and controls a conduction-state (on-state)/a non-conduction-state (off-state) of the power voltage VCO applied to the power controlled module 13. Further, as will be described later, the first power controller 11 is constituted to be replaceable with a power controller including a similar structure or function for online period T3 of the power control system 10. The first power controller 11 comprises a feed circuit 111, a power control circuit 112 and a CPU 113.

The feed circuit (feeding module) 111 supplies the power voltage VCO supplied from the power supply unit PSU to each circuit (112, 113) as internal power voltage VCC converted into low voltage in accordance with control of the CPU 113.

The power control circuit (power controller) 112 transmits control signal CS1 and the clock signal CK to the second power controller 12, and causes the second power controller 12 to latch control signal CS1 in accordance with the control of the CPU 113. Further, the power control circuit 112 transmits control signal CS2 having a value similar to that of control signal CS1 to the power controlled module 13 at timing of rising of the clock signal CK in accordance with the control of the CPU 113.

The CPU (controller, central controller) 113 controls the whole operation of the first power controller 11.

As in the above structure, the power control circuit 112 needs to control at least of the clock signal CK which is a latch signal, and control signals CS1 and CS2. Thus, the power control circuit 112 performs the following three steps when the power controlled module 13 is controlled:

First step: Output control signal CS1;

Second step: Toggle the clock signal CK (0→1→0); and

Third step: Output control signal CS2 to the power controlled module 13 in accordance with timing at which a latch circuit 122 outputs control signal CS2 to a rising edge (0→1) of the clock signal CK in the second step.

It should be noted that control signal CS2 is a signal of OR logic (wired-OR) formed by connecting two output signals of the power control circuit 112 and the latch circuit 122.

[Second Power Controller]

The second power controller (second control module, second power control circuit) 12 receives the clock signal CK and control signal CS1, and transmits control signal CS2 having a value (information) identical to that of latched control signal CS1 to the power controlled module 13.

Further, the second power controller 12 is constituted to be (a component of) hardware which is physically separated from the first power controller 11 and is different from the first power controller 11. For example, the second power controller 12 is constituted of other modules, etc., different from those of the first power controller 11.

According to the structure of the second power controller 12, the whole operation of the power control system 10 does not stop even if the first power controller 11 is replaced with a power controller including a different similar structure for online period T3 of the power control system 10 which will be described later. In other words, even if the first power controller 11 is replaced with the power controller including the different similar structure for online period T3, the operation of the power controlled module 13 can be continued without producing any effect on the operation condition of the whole power control system 10. This will be described later in detail. Further, the second power controller 12 comprises a feed circuit 121 and the latch circuit 122.

The feed circuit (feeding module) 121 supplies the power voltage VCO supplied from the power supply unit PSU to each circuit (122) as the internal power voltage VCC converted into low voltage.

The latch circuit (signal holding module) 122 receives the clock signal CK and control signal CS1 from the power control circuit 112, and transmits control signal CS2 having a value identical to that of latched control signal CS1 to the power controlled module 13 at timing of rising of the clock signal CK. The latch circuit 122 will be described later in detail.

[Power Controlled Module]

The power controlled module 13 is controlled a conduction-state (on-state)/a non-conduction-state (off-state) of the power voltage VCO applied from the power supply unit PSU based on control signal CS2 transmitted from the first and second power controllers 11 and 12. The power controlled module 13 can be mounted on a storage system, etc., utilized in an information processing system such as a cloud computing system. The storage system is utilized for a fundamental system whose operation is hard to stop. A specific example of the storage system will be described later in a third embodiment. Normally, the power controlled module 13 itself does not voluntarily control the conduction-state/non-conduction-state of the power voltage VCO. The power controlled module 13 comprises a control circuit 131, a switching element FET and a feed circuit 132.

The control circuit (power controller) 131 switches voltage applied to a control terminal (gate) of the switching element FET based on input control signal CS2. Then, the control circuit 131 switches the on-state/off-state of a current path of the switching element FET, and controls the power voltage VCO to be input to feed circuit 131.

Regarding the switching element FET, the power voltage VCO is applied to one end of the current path (source), the other end of the current path (drain) is connected to an input of the feed circuit 132, and the control terminal (gate) is connected to an output of the control circuit 131. An N-type field-effect transistor is cited as an example of the switching element FET. However, it is not limited to this structure.

The feed circuit 132 supplies the power voltage VCO obtained through the current path of the switching element FET to each arbitrary circuit (component) not shown.

In the above-described structure, each of control signals CS1 and CS2 is a signal for directly connecting drain terminals of the power control circuit 112 and the latch circuit 122 to the outside (open drain signal). Thus, control signals CS1 and CS2 are advantageous in that they are not limited to predetermined logical amplitude. Further, control signal CS2 is a signal of OR logic (wired-OR) formed by connecting two output signals of the power control circuit 112 and the latch circuit 122.

Furthermore, the above-described the power supply unit PSU, first and second power controllers 11 and 12 and power controlled module 13 are not necessarily mounted on a single circuit board, card board or the like, as long as they are electrically connected based on the relationship shown in FIG. 1. This will be described in detail in the third embodiment.

[Structure (Latch Circuit)]

Next, the structure of the latch circuit 122 according to the first embodiment will be described in more detail with reference to FIG. 2.

As shown in the figure, the latch circuit 122 according to the first embodiment comprises a reset IC 122-1 and a flip-flop circuit 122-2.

The reset IC (reset module) 122-1 is operated by the internal power voltage VCC applied from the feed circuit 121, and outputs a reset signal RE to a reset terminal (Reset) of the flip-flop circuit 122-2.

In the flip-flop circuit (D-FF, control signal holding module) 122-2, control signal CS1 transmitted from the power control circuit 122 as an input (D) is latched as control signal CS2 as an output (Q) at an rising edge of the clock signal CK transmitted from the power control circuit 112.

As described above, the latch circuit 122 is constituted of a D-type flip-flop (D-FF) to which control signal CS1 and the clock signal CK issued by the power control circuit 112 of the first power controller 11 are input as a data signal (D) and a latch signal (CK), respectively.

In the above structure, when a signal edge when the clock signal CK which is a latch signal is shifted from 0 (low) state to 1 (high) state is detected, control signal CS1 is latched, and the flip-flop circuit 122-2 outputs control signal CS2 having a value identical to that of control signal CS1 from the output (Q). On the other hand, regarding the flip-flop circuit 122-2, even if control signal CS1 changes, the value of the output (Q) does not change in a state where the clock signal CK which is a latch signal is not shifted (continuously outputs a value before shift).

Thus, even if the first power controller 11 is online replaced, the power controlled module 13 can be controlled by controlling only control signal CS2 by the second power controller 12.

[Operation (Power Control Operation)]

Figure 3:
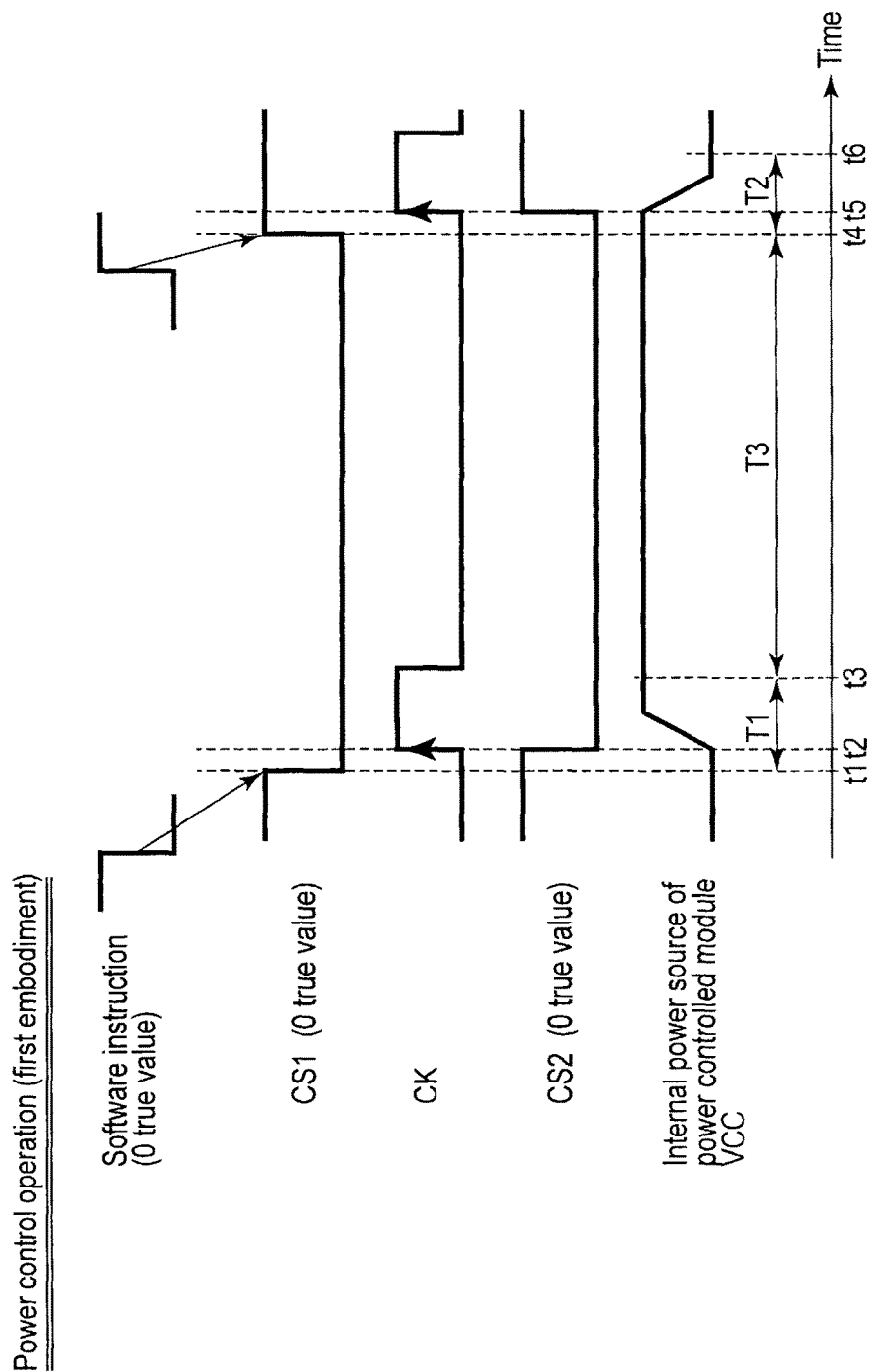
FIG. 3 is a timing chart showing a power control operation of the power control system according to the first embodiment.

Next, in the above structure, a power control operation of the power control system 10 according to the first embodiment will be described with reference to FIG. 3.

[Power-on Period T1]

First, at time t1, the power control circuit 112 receives a falling edge (1 [high]→0 [low]) of a predetermined software instruction (0 true value) based on a power state of the power controlled module 13 as a trigger, and shifts control signal CS1 (0 true value) from 1 (high) to 0 (low).

At time t2, when a signal edge when the clock signal CK transmitted from the power control circuit 112 is shifted from 0 (low) to 1 (high) is detected, the latch circuit 122 latches control signal CS1. Furthermore, the latch circuit 122 outputs control signal CS2 having a true value identical to that of control signal CS1 from the output (Q) to the power controlled module 13. Further, the power control circuit 112 outputs control signal CS2 to the power controlled module 13 at the timing. As shown above, control signal CS2 is a signal of OR logic (wired-OR) formed by connecting two output signals of the power control circuit 112 and the latch circuit 122.

Then, at time t2, the control circuit 131 of the power controlled module 13 applies voltage to the control terminal (gate) of the switching element FET based on input control signal CS2 such that the current path of the switching element FET is turned to be on-state. Thus, the feed circuit 132 supplies the power voltage VCO supplied from the power supply unit PSU to each predetermined circuit (component) not shown through the current path of the switching element FET which is on-state as the internal power voltage VCC.

Thus, at time t2, a voltage value of the internal power voltage VCC of the power controlled module 13 starts to increase.

Subsequently, at time t3, the power control circuit 112 issues a latch signal to the latch circuit 122 after control signal CS2 is shifted from 1 (high) to 0 (low) (toggle CK: 0→1→0). Then, at time t3, an increase to a predetermined voltage value of the internal power source VCC of the power controlled module 13 is completed.

Thus, after time t3, the power controlled module 13 can perform a predetermined operation using the internal power source VCC. For example, if the power controlled module 13 is a server, a storage device, or the like used for a fundamental system, etc., the server or storage device can perform a predetermined data writing operation, etc.

As shown above, period T1 between times t1 and t3 is a power-on period of the power controlled module 13.

[Power-Off Period T2]

Subsequently, at time t4, the power control circuit 112 receives a rising edge (0 [low]→1 [high]) of a predetermined software instruction (0 true value) based on a power state of the power controlled module 13 as a trigger, and shifts control signal CS1 (0 true value) from 0 (low) to 1 (high).

At time t5, when a signal edge when the clock signal CK transmitted from the power control circuit 112 is shifted from 1 (high) to 0 (low) is detected, the latch circuit 122 latches control signal CS1. Furthermore, the latch circuit 122 outputs control signal CS2 having a true value identical to that of control signal CS1 from the output (Q) to the power controlled module 13. Further, the power control circuit 112 outputs control signal CS2 to the power controlled module 13 at the timing. As shown above, control signal CS2 is a signal of OR logic (wired-OR) formed by connecting two output signals of the power control circuit 112 and the latch circuit 122.

Then, at time t5, the control circuit 131 of the power controlled module 13 applies voltage to the control terminal (gate) of the switching element FET based on input control signal CS2 such that the current path of the switching element FET is turned to be off-state. Then, supply of the power voltage VCO from the power supply unit PSU to the feed circuit 132 stops. As a result, supply of the internal power voltage VCC to each predetermined circuit (component) not shown stops.

Thus, at time t5, the voltage value of the internal power voltage VCC of the power controlled module 13 starts to decrease.

Subsequently, at time t6, the power control circuit 112 issues a latch signal to the latch circuit 122 after control signal CS2 is shifted from 0 (low) to 1 (high) (toggle CK: 0→1→0). Then, at time t6, the internal power source VCC of the power controlled module 13 decreases to a voltage value (for example, 0 V) of a predetermined ground power source.

As shown above, period T2 between times t4 and t6 is a power-off period of the power controlled module 13.

[Online Period T3]

For period T3 between times t3 and t4, a necessary internal power source VCC is supplied to the power controlled module 13. Thus, if the power controlled module 13 is mounted on, for example, a storage system utilized in a server, period T3 is a period in which the power controlled module 13 can perform a predetermined necessary operation (for example, data writing of user data to storage module) through a network (hereinafter referred to as online period [system operable period] T3).

Then, replacing the first power controller 11 with another power controller including a similar structure or function for online period T3 (hereinafter referred to as online replacement) will be described with reference to FIG. 4.

As indicated by broken lines in the figure, the first power controller 11 is temporarily removed from a circuit board, etc., to perform the online replacement for online period T3. In other words, the power control system 10 does not temporarily comprise the first power controller 11 when the online replacement is performed. Here, the structure or function of the first power controller 11 is not simply made redundant. Thus, it also appears as a matter of form that a structure for outputting control signal CS2 is lost, power control of the power controlled module 13 cannot be continued, and the whole operation of the system 10 stops.

However, the power control system 10 according to the first embodiment comprises the second power controller 12 including the latch circuit 122. When a signal edge when the clock signal CK which is a latch signal is shifted from 0 (low) to 1 (high) is detected, control signal CS1 is latched, and the latch circuit 122 outputs control signal CS2 having a value identical to that of control signal CS1 from the output (Q) (time t2 in FIG. 3). On the other hand, in a state where the clock signal CK which is a latch signal is not shifted, even if control signal CS1 changes, the value of the output (Q) does not change, and the latch circuit 122 continuously outputs the value of control signal CS2 before shifting (from times t3 to t4 in FIG. 3).

Thus, as shown in FIG. 4, the latch circuit 122 can continuously output the value of control signal CS2 before shifting and control the power controlled module 13 even in a state where the first power controller 11 is temporarily removed from a circuit board, etc.

More specifically, the control circuit 132 of the power controlled module 13 applies voltage to the control terminal (gate) of the switching element FET based on control signal CS2 input by the latch circuit 122 such that the current path of the switching element FET is turned to be on-state. Thus, feed circuit 131 supplies the power voltage VCO supplied from the power supply unit PSU to each predetermined circuit (component) not shown through the current path of the switching element FET which has been turned to be on-state as the internal power voltage VCC. As shown above, the operation of the power control system 10 can be continued even when the online replacement of the first power controller 11 is performed. In other words, the power controlled module 13 can be controlled by causing the second power controller 12 to control only control signal CS2 even in a state where the first power controller 11 is online replaced.

Subsequently, the online replacement is completed by re-mounting another power controller including a structure or function similar to that of the first power controller 11 removed from a circuit board, etc., on the circuit board instead of the removed first power controller 11.

Advantageous Effects

As described above, the memory system 10 according to the first embodiment allows at least the following advantages (1) to (3) to be obtained.

(1) An important function such as the power controller 11 constituting a power function can be mounted on components other than the power controlled module 13, and convenience can be improved (1A). Online replacement of the important function such as the power controller 11 can be performed (1B).

(1A) A memory module, etc., constituting a storage mounted on a server or a storage system utilized, for example, in a fundamental system which is an example of systems in which the power controlled module 13 is mounted are often made redundant. This is because an operation of the server or storage system does not stop and a normal operation continues even if a failure occurs in part of the memory module.

On the other hand, other modules, etc., on which the components other than the power controlled module 13 are mounted are not made redundant in many cases. Thus, the important function (function of stopping the operation of the whole system when the operations of the other modules stop, for example, power function) cannot be mounted on the components other than the power controlled module 13. As a result, the other modules, etc., are limited to a module which does not produce an effect on the operation state of the whole system even if a failure occurs (for example, module for monitoring a system (monitoring device), etc.).

Then, the power control system 10 according to the first embodiment comprises the second power controller 12 including the latch circuit 122. When a signal edge when the clock signal CK which is a latch signal is shifted from 0 (low) to 1 (high) is detected, control signal CS1 is latched, and the latch circuit 122 outputs control signal CS2 having a value identical to that of control signal CS1 from the output (Q) (time t2 in FIG. 3). On the other hand, in a state where the clock signal CK which is a latch signal is not shifted, even if control signal CS1 changes, the value of the output (Q) does not change, and the latch circuit 122 continuously outputs the value of control signal CS2 before shifting (times t3 to t4 in FIG. 3).

Thus, as shown in FIG. 4, the latch circuit 122 can continuously output the value of control signal CS2 before shifting, and control the power controlled module 13 even in a state where the first power controller 11 is temporarily removed from a circuit board, etc.

More specifically, the control circuit 132 of the power controlled module 13 applies voltage to the control terminal (gate) of the switching element FET based on control signal CS2 input by the latch circuit 122 such that the current path of the switching element FET is turned to be on-state. Thus, feed circuit 131 supplies the power voltage VCO supplied from the power supply unit PSU to each predetermined circuit (component) not shown through the current path of the switching element FET which has been turned to be on-state as the internal power voltage VCC.

As shown above, the operation of the power control system 10 can be continued even if a failure occurs in the first power controller 11, and the first power controller 11 needs to be replaced for online period T3. In other words, the power controlled module 13 can be controlled by causing the second power controller 12 to control only control signal CS2 even in a state where the first power controller 11 is online replaced.

As a result, an important function such as the power controller 11 constituting a power function can be mounted on the components other than the power controlled module 13, and convenience can be improved. Accordingly, the components other than the power controlled module 13 according to the first embodiment are not limited to a module which does not produce an effect on the operation state of the whole system 10 even if a failure occurs (for example, module for monitoring a system).

(1B) Furthermore, as indicated by broken lines in FIG. 4, the first power controller 11 is temporarily removed from a circuit board, etc., for online period T3. In other words, the power control system 10 does not temporarily comprise the first power controller 11 for online period T3.

However, in the power control system 10 according to the first embodiment, the power controlled module 13 can be controlled by causing the second power controller 12 to control only control signal CS2 even in a state where the first power controller 11 is online replaced, as described above.

As a result, online replacement can be easily performed by re-mounting another power controller including a structure or function similar to that of the removed first power controller 11 on the circuit board while the power controlled module 13 is controlled by the control of only the second power controller 12.

In the online replacement of the first power controller 11, the other power controller to be newly mounted is not necessarily mounted on the same circuit board on which the first power controller 11 was mounted. For example, it suffices that the other power controller to be newly mounted is electrically connected to the second power controller 12 and the power controlled module 13 in a similar signal relationship and power relationship shown in FIG. 1. Further, the power function is here cited as an example of the important function. However, obviously, the important function is not limited to the power function.

(2) An occupied area can be prevented from increasing.

As described above, the second power controller 12 is not obtained merely by making the first power controller 11 redundant.

Here, suppose the first power controller 11 is merely made redundant. In this case, a power controller including a structure similar to that of the first power controller 11 needs to be mounted on a circuit board, and thus, simply, twice the size of occupied area is necessary on the circuit board.

However, the second power controller 12 according to the first embodiment does not comprise the CPU 113 or the power control circuit 112 which has a larger occupied area in comparison with feed circuits 111 and 121. The second power controller 12 includes an extremely simple structure comprising the feed circuit 121 and the latch circuit 122 having a small occupied area. In other words, although it can be said that the second power controller 12 is functionally made redundant, it is not simply structurally made redundant.

As described above, the power control system 10 according to the first embodiment is advantageous in that the occupied area can be prevented from increasing.

(3) Reliability can be improved.

Control signal CS2 according to the first embodiment is a signal of OR logic (wired-OR) formed by connecting two output signals of the power control circuit 112 and the latch circuit 122.

Here, in a case where control signal CS2 is transmitted from only the second power controller 12, when a failure occurs in the second power controller 12, control signal CS2 cannot be transmitted to the power controlled module 13.

However, in the first embodiment, control signal CS2 is a signal of OR logic formed by connecting two output signals of the power control circuit 112 and the latch circuit 122. The above structure allows the power controlled module 13 to be controlled by control signal CS2 from the power control circuit 112 of the first power controller 11, and the operation of the whole system 10 to be continued even if a failure occurs in the second power controller 12. As shown above, the power control system 10 according to the first embodiment is advantageous in that reliability can be improved.

Second Embodiment [Example of Making Second Power Controller Redundant]

Figure 5:
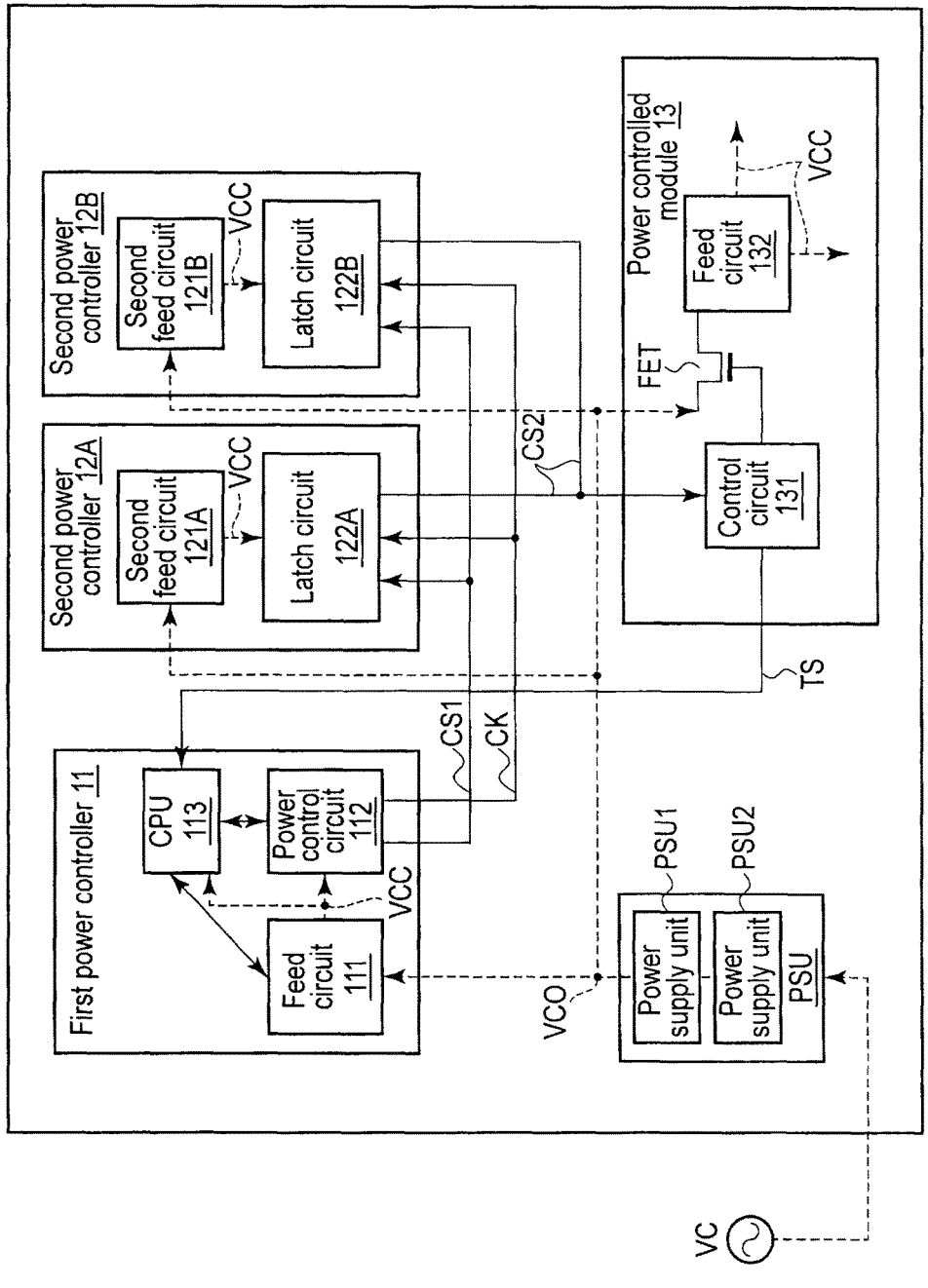
FIG. 5 is a block diagram showing a power control system according to a second embodiment.
Figure 6:
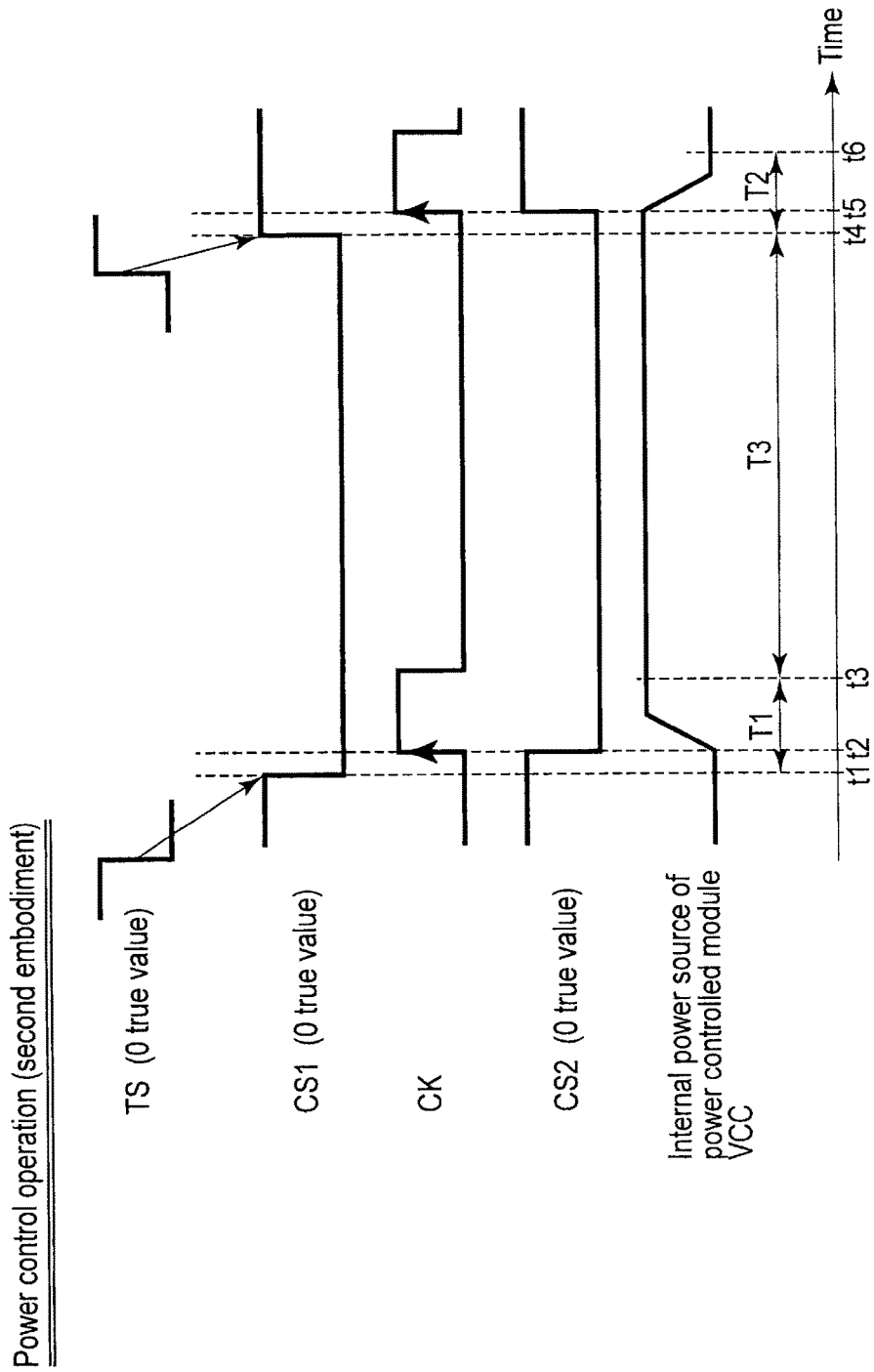
FIG. 6 is a timing chart showing a power control operation of the power control system according to the second embodiment.

Next, a power control system 10 according to a second embodiment will be described with reference to FIGS. 5 to 7. The second embodiment relates to an example of making a second power controller redundant. Description of portions substantially overlapping with the first embodiment will be omitted.

[Structure (Power Control System)]

The power control system 10 according to the second embodiment will be described with reference to FIG. 5. As shown in the figure, the power control system 10 according to the second embodiment is different from that of the first embodiment in the following respects.

First, the power control system 10 according to the second embodiment comprises two redundant second power controllers 12A and 12B. Two second power controllers 12A and 12B comprise similar structures. That is, second power controllers 12A and 12B comprise second feed circuits 121A and 121B and latch circuits 122A and 122B, respectively.

Control signal CS2 to be input to a power controlled module 13 is output from latch circuits 122A and 122B of second power controllers 12A and 12B, and control signal CS2 is not output from a first power controller. Similarly, control signal CS1 and the clock signal CK transmitted from a first power controller 11 are input to latch circuits 122A and 122B of second power controllers 12A and 12B. Since latch circuits 122A and 122B include structures substantially similar to that of the latch circuit 122 according to the first embodiment, detailed description thereof will be omitted.

A trigger signal TS is input from a control circuit 131 to a CPU 113 of the first power controller 11 based on a state of a power source of the power controlled module 13. It should be noted that the trigger signal TS may be a predetermined software instruction as well as in the first embodiment.

Here, although two redundant second power controllers 12A and 12B are cited as an example, the number of times of redundancy is not limited to this. That is, it suffices that the number of times of redundancy is at least one. For example, obviously, four redundant second power controllers can be included.

Since the other structures are substantially similar to those in the first embodiment, detailed description thereof will be omitted.

[Operation (Power Control Operation)]

Next, in the above structure, a power control operation of the power control system 10 according to the second embodiment will be described with reference to FIG. 6.

[Power-on Period T1]

First, at time t1, a power control circuit 112 shifts control signal CS1 (0 true value) from 1 (high) to 0 (low) with a falling edge (1 [high]→0 [low]) from the power control circuit 131 to the trigger signal TS (0 true value) as a trigger.

At time t2, when a signal edge when the clock signal CK transmitted from the power control circuit 112 is shifted from 0 (low) to 1 (high) is detected, latch circuits 122A and 122B latch control signal CS1. Furthermore, latch circuits 122A and 122B output control signal CS2 having a true value identical to that of control signal CS1 from an output (Q) to the power controlled module 13. As shown above, control signal CS2 according to the second embodiment is a signal of OR logic (wired-OR) formed by connecting output signals of two latch circuits 122A and 122B.

Then, at time t2, the control circuit 131 of the power controlled module 13 applies voltage to a control terminal (gate) of the switching element FET based on input control signal CS2 such that a current path of the switching element FET is turned to be on-state. Thus, a feed circuit 132 supplies the power voltage VCO supplied from the power supply unit PSU to each predetermined circuit (component) not shown through the current path of the switching element FET which has been turned to be on-state as the internal power voltage VCC.

Thus, at time t2, a voltage value of the internal power voltage VCC of the power controlled module 13 starts to increase from a voltage value of a ground power source (for example, 0 V).

Subsequently, at time t3, the power control circuit 112 issues a latch signal to the latch circuit 122 (toggle CK: 0→1→0) after control signal CS2 is shifted from 1 (high) to 0 (low). Then, an increase to a predetermined voltage value of the internal power source VCC of the power controlled module 13 is completed at time t3.

Thus, after time t3, the power controlled module 13 can start a predetermined operation using the internal power source VCC. For example, if the power controlled module 13 is mounted on a server, a storage device, or the like used for a fundamental system, etc., the server or storage device can start a predetermined data writing operation, etc.

As shown above, period T1 between times t1 and t3 is a power-on period of the power controlled module 13 (pressor period of power voltage).

[Power-Off Period T2]

Subsequently, at time t4, the power control circuit 112 shifts control signal CS1 (0 true value) from 0 (low) to 1 (high) with a rising edge (0 [low]→1 [high]) of the trigger signal TS (0 true value) from the control circuit 131 of the power controlled module 13 as a trigger.

At time t5, when a signal edge when the clock signal CK transmitted from the power control circuit 112 is shifted from 0 (low) to 1 (high) is detected, the latch circuit 122 latches control signal CS1. Furthermore, the latch circuit 122 outputs control signal CS2 having a true value identical to that of control signal CS1 from the output (Q) to the power controlled module 13. Control signal CS2 according to the second embodiment is a signal of OR logic (wired-OR) formed by connecting output signals of two latch circuits 122A and 122B.

Then, at time t5, the control circuit 131 of the power controlled module 13 applies voltage to the control terminal (gate) of the switching element FET based on input control signal CS2 such that the current path of the switching element FET is turned to be off-state. Then, supply of the power voltage VCO from the power supply unit PSU to the feed circuit 132 stops. As a result, supply of the internal power voltage VCC to each predetermined circuit (component) not shown stops.

Thus, at time t5, the voltage value of the internal power voltage VCC of the power controlled module 13 starts to decrease.

Subsequently, at time t6, the power control circuit 112 issues a latch signal to the latch circuit 122 (toggle CK: 0→1→0) after control signal CS2 is shifted from 0 (low) to 1 (high). Then, at time t6, the internal power source VCC of the power controlled module 13 decreases from the voltage value of the internal power source VCC to that of a predetermined ground power source (for example, 0 V).

As shown above, period T2 between times t4 and t6 is a power-off period of the power controlled module 13 (depressor period of power voltage).

[Online Period T3]

For period T3 between times t3 and t4, the internal power source VCC necessary for the power controlled module 13 is supplied. Thus, period T3 is an online period if the power controlled module 13 is mounted on, for example, a server or a storage system.

Then, online replacement of the first power controller 11 and second power controller 12A with a power controller including a different similar structure or function for online period T3 will be described with reference to FIG. 7.

As indicated by broken lines in the figure, for online period T3, the first power controller 11 and second power controller 12A are temporarily removed from a circuit board, etc., to perform the online replacement. In other words, the power control system 10 does not temporarily comprise the first power controller 11 and second power controller 12A when the online replacement is performed.

However, the power control system 10 according to the second embodiment comprises second power controller 12B including latch circuit 122B. When a signal edge when the clock signal CK which is a latch signal is shifted from 0 (low) to 1 (high) is detected, control signal CS1 is latched, and latch circuit 122B outputs control signal CS2 having a value identical to that of control signal CS1 from the output (Q) (time t2 in FIG. 6). On the other hand, in a state where the clock signal CK which is a latch signal is not shifted, even if control signal CS1 changes, the value of the output (Q) does not change, and latch circuit 122B continuously outputs the value of control signal CS2 before shifting (times t3 to t4 in FIG. 6).

Figure 7:
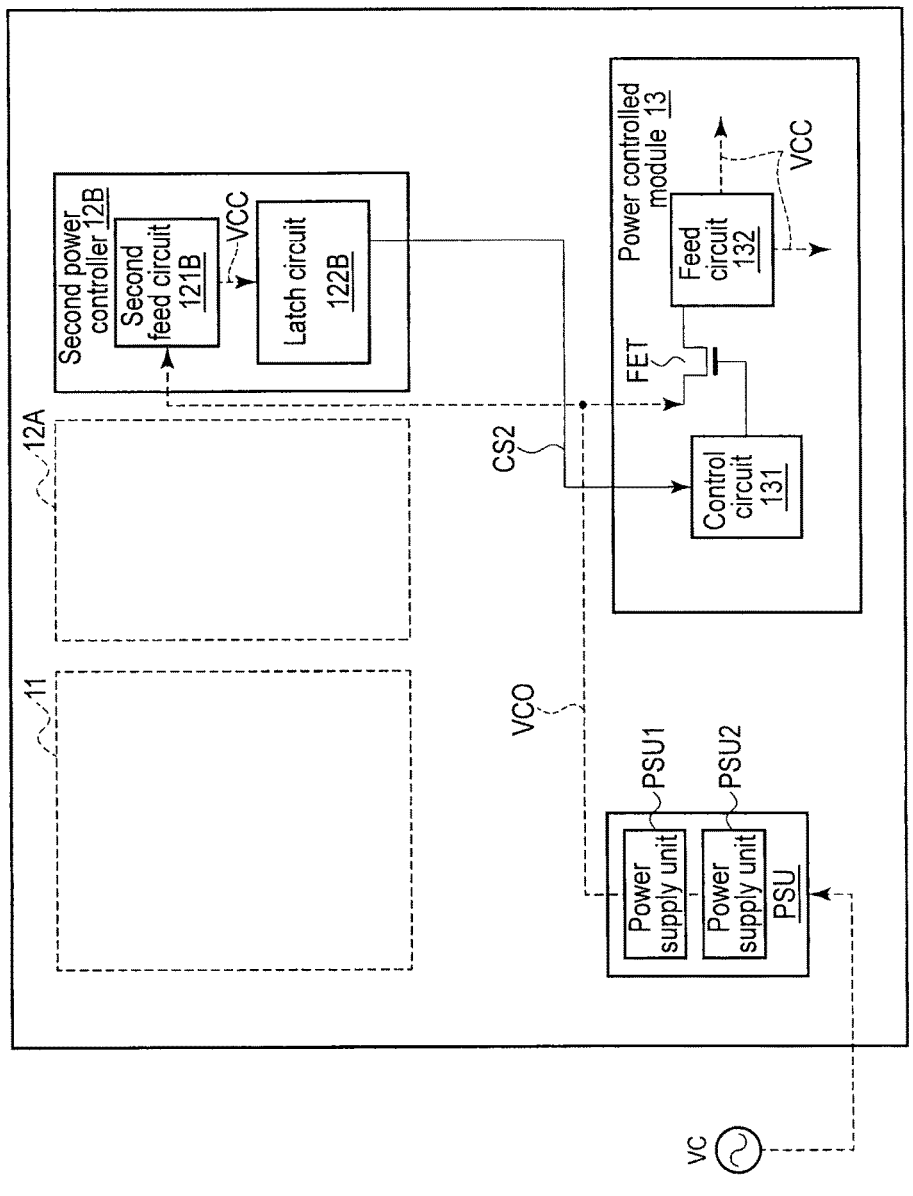
FIG. 7 is a block diagram showing the power control system according to the second embodiment at the time of online replacement.

Thus, as shown in FIG. 7, even in a state where the first power controller 11 and second power controller 12A are temporarily removed from a circuit board, etc., latch circuit 122B can continuously output the value of control signal CS2 before shifting, and control the power controlled module 13.

More specifically, the control circuit 132 of the power controlled module 13 applies voltage to the control terminal (gate) of the switching element FET based on control signal CS2 input by latch circuit 122B such that the current path of the switching element FET is turned to be on-state. Thus, feed circuit 131 supplies the power voltage VCO supplied from the power supply unit PSU to each predetermined circuit (component) not shown through the current path of the switching element FET which has been turned to be on-state as the internal power voltage VCC.

As shown above, the operation of the power control system 10 can be continued even when the online replacement of the first power controller 11 and second power controller 12A is performed. In other words, the power controlled module 13 can be controlled by causing second power controller 12B to control only control signal CS2 even in a state where the first power controller 11 and second power controller 12A are online replaced.

Subsequently, online replacement is completed by re-mounting another power controller including a structure or function similar to those of the first power controller 11 and second power controller 12A on the circuit board instead of the first power controller 11 and second power controller 12A removed from the circuit board, etc.

Since the other operations are substantially similar to those in the first embodiment, detailed description thereof will be omitted.

Advantageous Effects

As described above, the memory system 10 according to the second embodiment allows advantages similar to the above advantages (1) to (3) to be obtained. Furthermore, the memory system 10 according to the second embodiment allows at least the following advantages (4) and (5) to be obtained.

(4) Reliability can be further improved.

The power control system 10 according to the second embodiment comprises two redundant second power controllers 12A and 12B. Each of two second power controllers 12A and 12B comprises similar structures.

The above structure allows online replacement to be performed on either of second power controllers 12A and 12B as well as on the first power controller 11.

For example, as indicated by broken lines in FIG. 7, the first power controller 11 and second power controller 12A are temporarily removed from a circuit board, etc., to perform the online replacement for online period T3.

However, the power control system 10 according to the second embodiment comprises second power controller 12B including latch circuit 122B. When a signal edge when the clock signal CK which is a latch signal is shifted from 0 (low) to 1 (high) is detected, control signal CS1 is latched, and latch circuit 122B outputs control signal CS2 having a value identical to that of control signal CS1 from the output (Q) (time t2 in FIG. 6). On the other hand, in a state where the clock signal CK which is a latch signal is not shifted, even if control signal CS1 changes, the value of the output (Q) does not change, and latch circuit 122B continuously outputs the value of control signal CS2 before shifting (times t3 to t4 in FIG. 6).

Thus, as shown in FIG. 7, even in a state where the first power controller 11 and second power controller 12A are temporarily removed from a circuit board, etc., latch circuit 122B can continuously output the value of control signal CS2 before shifting, and control the power controlled module 13.

As shown above, the operation of the power control system 10 can be continued even when the online replacement of the first power controller 11 and second power controller 12A is performed. In other words, even in a state where the first power controller 11 and second power controller 12A are online replaced, the power controlled module 13 can be controlled by causing second power controller 12B to control only control signal CS2. Subsequently, the online replacement can be easily performed by re-mounting another power controller including a structure or function similar to those of the first power controller 11 and second power controller 12A on the circuit board instead of the first power controller 11 and second power controller 12A removed from the circuit board, etc.

As described above, even if a failure occurs in either of second power controllers 12A and 12B as well as the first power controller 11, the power control system 10 according to the second embodiment allows them to be easily online replaced. Thus, even if a failure occurs in either of second power controllers 12A and 12B as well as the first power controller 11, the operation can be continued without stopping the operation of the whole system 10. Accordingly, the power control system 10 according to the second embodiment is advantageous in that reliability of the whole system 10 can be further improved.

(5) Timing for controlling the power controlled module 13 can be matched, and design can be simplified.

In the second embodiment, control signal CS2 that controls the power controlled module 13 is output from latch circuit 122A of second power controller 12A and latch circuit 122B of second power controller 12B, and control signal CS2 is not output from the first power controller.

On the other hand, in the first embodiment, control signal CS2 that controls the power controlled module 13 is a signal of OR logic (wired-OR) formed by connecting two output signals of the power control circuit 112 and the latch circuit 122. Thus, the timing for controlling the power controlled module 13 sometimes differs depending on control signal CS2.

In the second embodiment, two redundant second power controllers 12A and 12B are present, as described above. Thus, the control timing of control signal CS2 according to the second embodiment can be matched to timing obtained by latching the clock signal CK (time t2 in FIG. 6). Accordingly, the design of the power control system 10 according to the second embodiment can be simplified without requiring complicated timing control.

In addition, two redundant second power controllers 12A and 12B do not comprise the CPU 113 or the power control circuit 112 having a larger occupied area in comparison with feed circuit 121A and 121B, as well as in the first embodiment. Second power controllers 12A and 12B include a simple structure comprising feed circuits 121A and 121B and latch circuits 122A and 122B, respectively, which have a small occupied area. Accordingly, the power control system 10 according to the second embodiment is advantageous in that increase of the occupied area can be restrained to the minimum. Further, it is advantageous also in that production cost can be reduced by simplifying the design and restraining the increase of the occupied area.

Third Embodiment [Example of Applying to Storage System]

Next, a third embodiment will be described with reference to FIGS. 8 to 32. The third embodiment relates to an example of applying the power control system 10 according to the second embodiment to a storage system 100. Here, a storage system 100 according to the third embodiment is, for example, a storage system utilized in a fundamental information processing system such as a cloud system whose operation is hard to stop.

[1. Structure]

[1-1. Overall Structure (Storage System)]

First, an overall structure of the storage system 100 according to the third embodiment will be briefly described with reference to FIG. 8.

As shown in the figure, the storage system 100 according to the third embodiment comprises a storage 101, a connection unit (CU) 110, an interface module 120, a management module (MM) 130, an power supply unit PSU and an auxiliary power supply unit BBU.

[Storage]

The storage (storage module) 101 comprises a plurality of node modules (NMs, memory modules) 140, each of which includes a storage function and a data transfer function. Each of the NMs 140 is mutually connected to an adjacent NM 140 through a mesh-shaped network. The storage 101 dispersively stores data in a plurality of NMs 140, and dispersively transfers the data in parallel. Thus, a data transfer function of the storage 101 comprises a transfer method for causing each of the NMs 140 to efficiently transfer a packet.

FIG. 8 shows an example of a rectangular network in which each of the NMs 140 is arranged at a lattice point. Coordinates of the lattice point is indicated by coordinates (x, y), and position information of the NM 140 arranged at the lattice point is indicated by node address ($x_D$, $y_D$) in response to the coordinates of the lattice point. Further, in the shown example, the NM 140 located in the upper left corner has node address (0, 0) of an origin. Each of the NMs 140 moves in a lateral direction (X direction) and in a longitudinal direction (Y direction), and an integer value of the node address increases or decreases.

Each of the NMs 140 comprises at least two interfaces 150. Each of the NMs 140 is mutually connected to adjacent NMs 140 through the interfaces 150. Each of the NMs 140 is connected to the adjacent NMs 140 in at least two different directions. For example, the NM 140 (0, 0) located nearest to the upper left corner is connected to NM 140 (1, 0) which is adjacent in the X direction and to NM 140 (0, 1) which is adjacent in the Y direction different from the X direction. Further, NM 140 (1, 1) is connected to four NMs which are adjacent in four directions different from each other, that is, NM 140 (1, 0), NM 140 (0, 1), NM 140 (2, 1) and NM 140 (1, 2). The NM 140 represented as node address ($x_D$, $y_D$) may be hereinafter simply shown as node ($x_D$, $y_D$).

Although each of the NMs 140 is shown to be arranged at a lattice point which is a rectangular lattice in FIG. 8, the form of arrangement of each of the NMs 140 is not limited to this example. That is, it suffices that each of the NMs 140 arranged at the lattice point is connected to NMs 140 which are adjacent in at least two different directions, and the form of lattice may be, for example, triangular or hexagonal. Further, although in FIG. 8, each of the NMs 140 is bidimensionally arranged, each of the NMs 140 may be arranged in three dimensions. If the NMs 140 are arranged in three dimensions, each of the NMs 140 can be designated by three values of (x, y, z). Further, if the NMs 140 are bidimensionally arranged, the NM 140s may be toroidally connected by connecting the NMs 140 located on sides opposite to each other.

Furthermore, the storage 101 comprises power controlled module 13N. The storage 101 will be described later in detail.

[Connection Unit (CU)]

The CU 110 comprises a predetermined connector which can be connected to an external user, inputs data to the storage 101 in accordance with a request (command, address, etc.) from the outside, and output the data read from the storage 101 to the outside. Specifically, the CU 110 comprises a storage unit and an arithmetic device which are not shown, and the arithmetic device executes a server application program while using the storage unit as a work area.

The CU 110 processes a request from the outside under control of a server application. The CU 110 executes access to the storage 101 in the course of processing the request from the outside. When accessing the storage 101, the CU 110 generates a packet which can be transferred or executed by the NM 140, and transmits the generated packet to the NM 140 connected to an own CU 110.

In the example of FIG. 8, the storage system 100 comprises four CUs 110. The four CUs 110 are connected to different NMs 140. Here, the four CUs 110 are connected to node (0, 0), node (1, 0), node (2, 0) and node (3, 0) in one-to-one relationship.

It should be noted that the number of CUs 110 can be arbitrarily constituted. Further, the CUs 110 can be connected to arbitrary NMs 140 constituting the storage 101. Further, one CU 110 may be connected to a plurality of NMs 140, and one NM 140 may be connected to a plurality of CUs 110. Further, a CU 110 may be connected to arbitrary NMs 140 of the plurality of NMs 140 constituting the storage 101.

Further, each of the CUs 110 comprises power controlled module 13C. The CUs 110 will be described later in detail.

[Interface Module]

The interface module 120 is a connection interface for extending the storage 101. For example, two physically-different storage systems 100 can be electrically connected to each other through the interface module 120. The connection allows the storage 101 of each of the storage systems 100 to be logically combined, and to be used as one storage 101. The interface module 120 is electrically connected from at least one NM 140 by the interface 150. Here, each of the interfaces 150 connected to four NMs 140 of node (0, 0), node (0, 1), node (0, 2) and node (0, 3) is connected to the interface module 120.

Further, the interface module 120 comprises two redundant second power controllers 12A and 12B. The interface module 120 will be described later in detail.

[Management Module (MM)]

The MM 130 is electrically connected to each of the CUs 110 and NM (0, 0). The MM 130 comprises a base management controller (BMC) not shown. The MM 130 executes, for example, monitoring of environmental temperature, monitoring and control of the number of rotations of fan, monitoring and control of power current and power voltage, record of status of each of the CUs 110, monitoring of temperature of each of the CUs 110, and reset of the CU 110, as part of a function of the BMC.

Further, the MM 130 executes processing to the storage 101 (NM control processing), as well as the function of the BMC. The NM control processing is arbitrarily performed. For example, if a first memory 141 to be described later is a NAND-type flash memory, the MM 130 may execute wear leveling of the first memory 141. Further, the MM 130 may indicate replacement of a card substrate on which a broken NM 140 is mounted to the outside through the CU 110 when the breakdown of the NM 140 is found. Further, after the card substrate is replaced, the MM 130 may perform rebuilding of a RAID to be described later.

It should be noted that the subject of detecting the breakdown of the NM 140 may be a node controller (NC) 140C to be described later or the CU 110. The detection of the breakdown of the NM 140 may be executed based on error detection of read data from the first memory 141 of the NM 140. When performing processing on the storage 101, the MM 130 issues a packet in accordance with the processing. The MM 130 issues, for example, a packet conforming to the form shown in FIG. 9 to be described later.

Further, the MM 130 comprises the first power controller 11. The MM 130 will be described later in detail.

[Power Supply Unit]

The power supply unit (main power unit) PSU converts external power voltage applied from the external power source VC into predetermined DC voltage, and supplies converted power voltage VCO to each of components (101, 110, 120, 130) in the same manner as described above. The external power source VC is, for example, an AC source of 100 V or 200 V. Similarly, the storage system 100 according to the third embodiment comprises two power supply units PSU-1 and PSU-2 (not shown). However, the structure of the power supply unit PSU is not limited to this.

Further, the power supply unit PSU comprises power controlled module 13P. The power supply unit PSU will be described later in detail.

[Auxiliary Power Supply Unit]

The auxiliary power supply unit (battery device, auxiliary power) BBU receives the power voltage VCO from the power supply unit PSU, and accumulates power in itself. Then, if the storage system 100 is electrically disconnected from the external power source VC, the auxiliary power supply unit BBU functions as auxiliary power for supplying predetermined auxiliary power voltage to each or circuits (101, 110, 120, 130). For example, the auxiliary power supply unit BBU supplies the auxiliary power voltage to each circuit to operate the storage 101, even if supply of power voltage from the external power source VC stops due to a power failure, etc. Then, the node controller (NC) 140C writes user data (data copy) in the first memory 141 by the supplied auxiliary power voltage, and performs backup to protect the user data.

Further, the auxiliary power supply unit BBU comprises power controlled module 13B. The auxiliary power supply unit BBU will be described later in detail.

[Interface Standard]

In the third embodiment, the following standards can be applied to an interface for electrically connecting each of the above structures.

First, the low-voltage differential signaling (LVDS) standard is applied to the interface 150 which connects between the NMs 140.

The PCI Express (PCIe) standard is applied to the interface 150 which electrically connects the NM 140 and the CU 110.

The LVDS standard and the joint test action group (JTAG) standard are applied to the interface 150 which electrically connects the NM 140 and the interface module 120.

The PCIe standard and the inter-integrated circuit (I2C) standard are applied to the interface 150 which electrically connects the NM 140 and the MM 130.

It should be noted that these standards are just examples, and obviously, other standards are applicable as necessary.

[1-2. Structure of Node Module (NM)]

Figure 9:
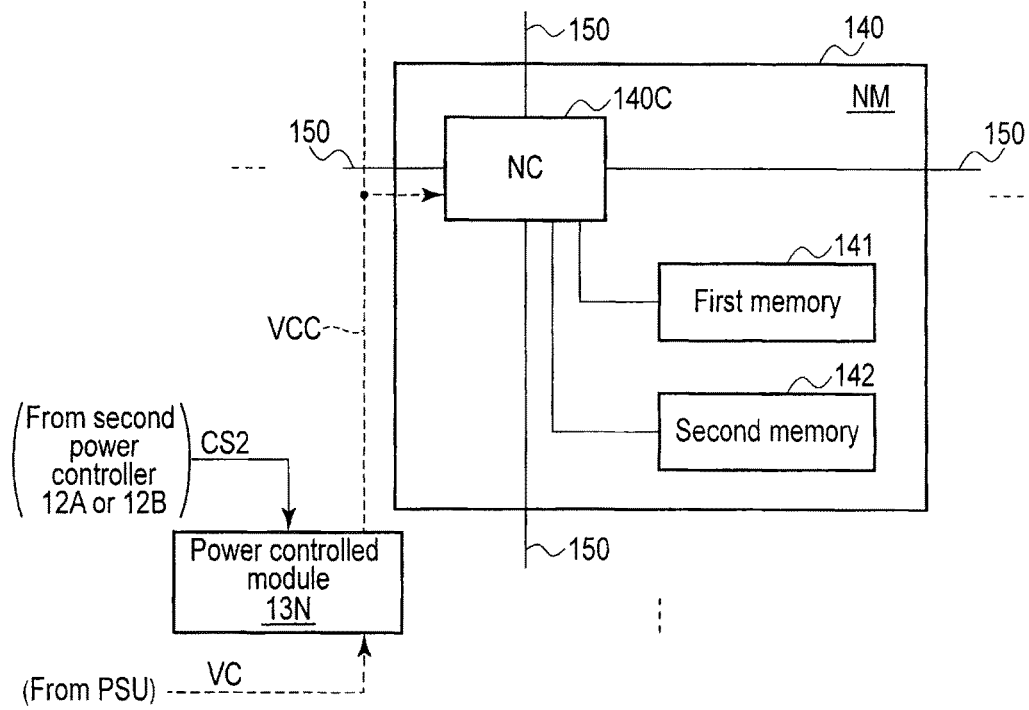
FIG. 9 shows an example of a structure of an NM.

Next, an example of the structure of the NM 140 will be described with reference to FIG. 9.

As shown in the figure, the NM 140 comprises the node controller (NC) 140C, the first memory 141 which functions as a storage memory, and a second memory 142 used by the NC 140C as a work area.

Four interfaces 150 are connected to the NC 140C. The NC 140C receives a packet from the CU 110 or another NM 140 through the interfaces 150, or transmits a packet to the CU 110 or another NM 140 through the interfaces 150. If a destination of the received packet is its own NM 140, the NC 140 executes processing in accordance with the packet (command recorded in the packet). For example, if the command is an access command (read command or write command), the NC 140C executes access of the first memory 141. If the destination of the receive packet is not the own NM 14, the NC 140C transfers the packet to another NM 140 connected to the own NM 140.

For example, a NAND-type flash memory (hereinafter referred to as a NAND memory), a bit cost scalable memory (BiCS), a magnetoresistive random access memory (MRAM), a phase-change memory (PcRAM), a resistance random access memory (RRAM [registered trademark]) or a combination thereof are applicable as the first memory 141.

Various RAMs are applicable as the second memory 142. If the first memory 141 provides a function as a work area, the second memory 142 is not necessarily arranged in the NM 140.

Furthermore, the storage 101 according to the third embodiment comprises power controlled module 13N. The structure of power controlled module 13N is substantially similar to that of the power controlled module 13 shown in the first and second embodiments.

Power controlled module 13N receives the power voltage VCO from the power supply unit PSU, and switches the on-state/off-state of the internal power voltage VCC applied to the NC 140C of each of the NMs 140 based on control signal CS2 from second power controllers 12A and 12B of the interface module 120.

[Packet Structure]

Figure 10:
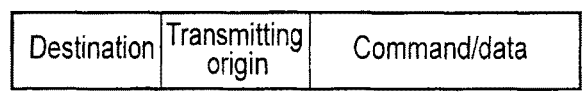
FIG. 10 is a figure for describing a structure of a packet.

FIG. 10 shows an example of a packet structure. As shown in the figure, a packet is constituted by recording a node address of a destination, a node address of a transmitting origin and a command or data.

The NC 140C which received the packet determines a routing destination based on predetermined transfer algorithm. Then, the packet is transferred between the NMs 140, and reaches the NM 140 of the destination.

For example, the NC 140C determines an NM 140, of a plurality of NMs 140 connected to the own NM 140, located on a route on which the number of transfers from its own NM 140 to an NM 140 of a destination is minimum to be the NM 140 of a transfer destination based on the node address of the destination in the packet.

If a plurality of routes on which the number of transfers from the own NM 140 to the NM 140 of the destination is minimum are present, the NC 140C selects one route from the plurality of routes by an arbitrary method based on the node address of the destination of the packet. Similarly, if the NM 140, of the plurality of NMs 140 connected to the own NM 140, located on the route on which the number of transfers is minimum is broken or busy, the NC 140C determines another NM 140 to be a transfer destination.

Here, the storage 101 is constituted by connecting the plurality of NMs 140 through a mesh network. Thus, a plurality of routes on which the number of transfers of the packet in the storage 101 is minimum are sometimes present. In this case, even if a plurality of packets addressed to a specific NM 140 are issued, the plurality of issued packets are dispersed and transferred to the plurality of routes by the transfer algorithm. Thus, access concentration to the specific NM 140 can be avoided, and a decline of throughput of the whole storage system 100 can be restrained.

[1-3. Redundancy of Storage]

Figure 11:
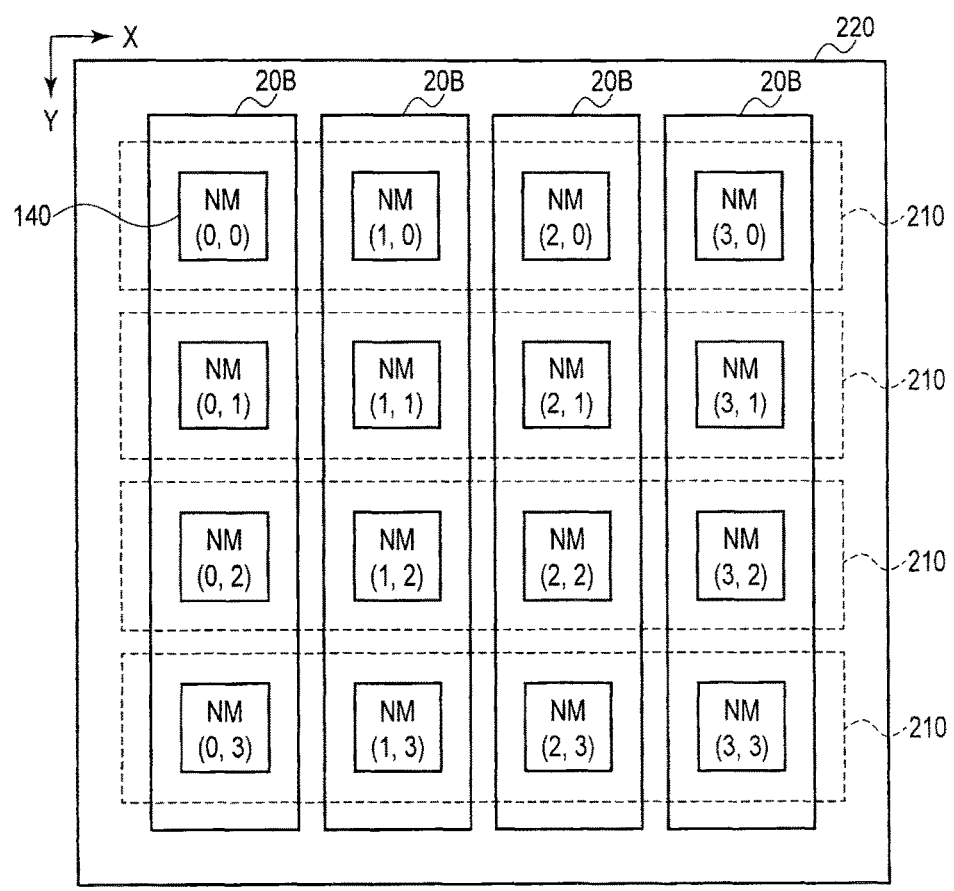
FIG. 11 shows an example of redundancy of a storage.

Next, an example of redundancy of the storage 101 will be described with reference to FIG. 11.

As shown in the figure, each of the NMs 140 is mounted on the card substrate 20B. Four card substrates 20B are detachably attached to backplane 220 through a connector. Four NMs 140 are mounted on each of the card substrates 20B. The four NMs 140 disposed in the Y direction are mounted on the same card substrate 20B, and the four NMs 140 disposed in the X direction are mounted on different card substrates 20B.

Here, a redundant array of inexpensive disks (RAID) can be constructed in the storage 101. For example, in the shown example, four RAID groups 210 are constructed, and each of the NMs 140 belongs to any of the four RAID groups 210.

Then, one RAID group 210 is constituted in the four NMs 140 mounted on the different card substrates 20B. Here, the four NMs 140 disposed in the X direction belongs to the same RAID group 210. For example, four NMs disposed in the X direction, that is, NM (0, 0), NM (1, 0), NM (2, 0) and NM (3, 0) belong to the same RAID group 210.

The level of the RAID to be applied is arbitrary. For example, in a case where RAID 5 is applied, when one of the plurality of NMs 140 constituting the RAID group 210 is damaged, data stored in the damaged NM 140 is restored by replacing the card substrate 20B including the damaged NM 140. Further, in a case where RAID 6 is applied, even if two NMs 140 of the plurality of NMs 140 constituting the RAID group 210 are damaged, data can be restored.

As described above, the storage 101 on which power controlled module 13N is mounted can be made redundant by constructing the RAID in the storage 101.

[1-4. Extension of Storage]

Figure 12:
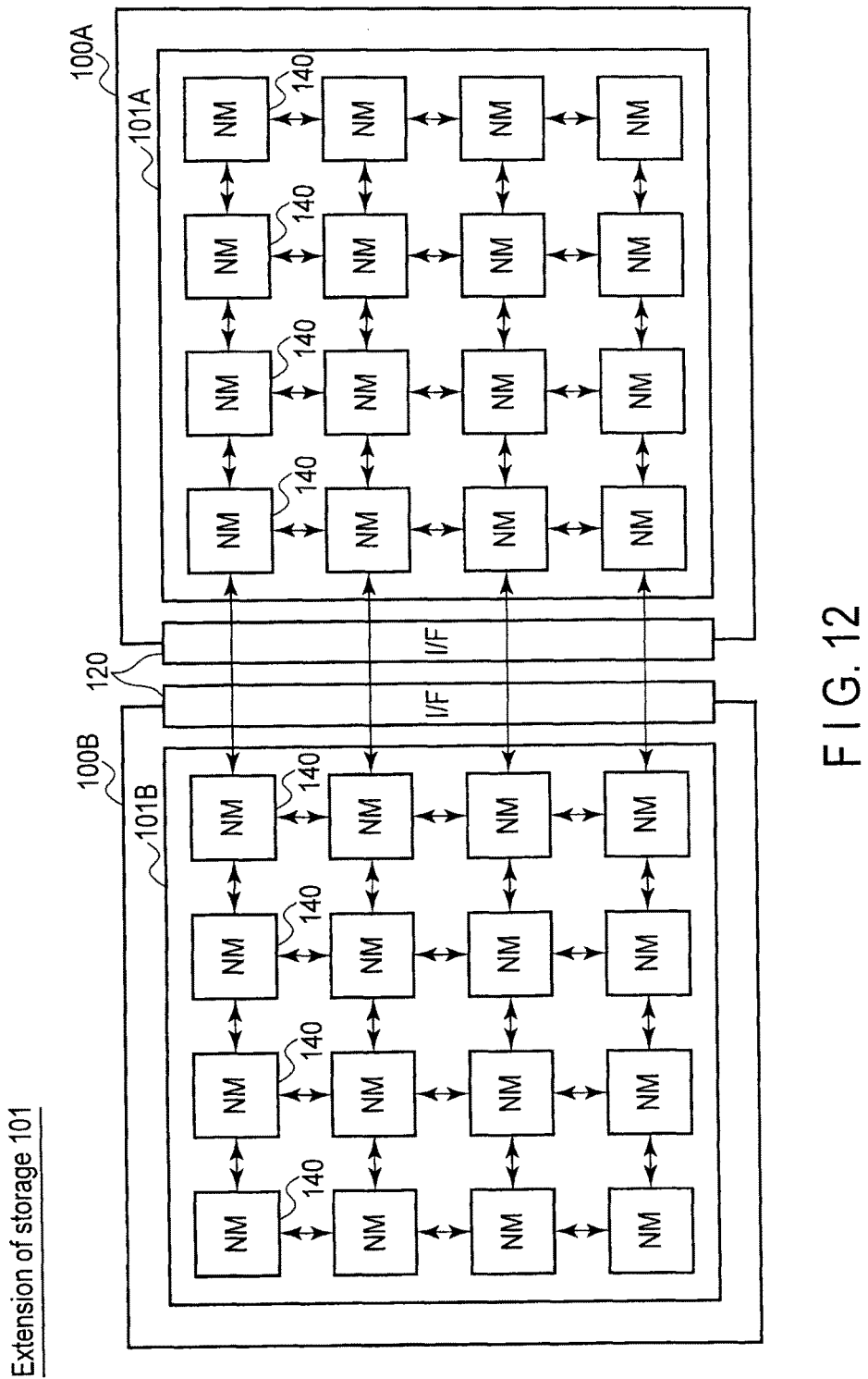
FIG. 12 shows an example of extension of the storage.

Next, an example of extension of the storage 101 will be described with reference to FIG. 12. The interface module 120 is a connection interface for extending the storage 101.

In the connection relationship shown in the figure, two storage systems 100A and 100B are connected through the interface modules 120. As shown in the figure, four NMs 140 of storage system 100A which is one of two storage systems 100A and 100B, and four NMs 14 of storage system 100B which is the other of two storage systems 100A and 100B are connected in one-to-one relationship through the interface modules 120.

A packet can be transferred between two storage systems 100A and 100B through the interface 150 connected by the interface modules 120. This allows two storages 101A and 101B constituted of a group of NMs 140 of four rows and four columns to be logically combined and to be used as a storage 101 constituted of a group of NMs 140 of four rows and eight columns.

Which of the plurality of NMs 140 constituting the storage 101 should be connected to the interface modules 120, and the number of NMs 140 connected to the interface modules 120 are arbitrarily determined. Further, variation of a connection relationship between the storages 101 will be described later.

[2. Mounting Example]

Next, a mounting example constituted by mounting each of the structures will be described.

[2-1. Overall Structure]

First, the overall structure of the mounting example will be described with reference to FIG. 13. FIG. 13 shows a housing (enclosure) 200 in which the storage system 100 is contained. The storage system 100 is contained in the enclosure 200 which can be mounted on a server rack 201.

The size of the enclosure 200 is determined by a standard to which the server rack 201 conforms. Regarding the size of the enclosure 200, the height is expressed by U (unit). For example, the enclosure 200 according to the third embodiment has the height of 2 U in a lamination direction (layer stack).

[2-1-1. Enclosure (Outer Appearance)]

Next, an outer appearance of the enclosure 200 containing the storage system 100 will be described with reference to FIG. 14.

As shown in the figure, the enclosure 200 comprises exterior members 211 to 213, a node module card (NMC), a connection unit card (CUC), an interface card (IFC), a management module card (MMC), a console card (COC), a power supply unit PSU, an auxiliary power supply unit BBU and a fan 203.

Exterior members 211 and 212 are arranged to cover each of the component members of the enclosure 200 in the lamination direction, and fixed by predetermined screwing, etc. Exterior member 213 is arranged to cover the front surface of each of the component members in the front side of the enclosure 200, and fixed by predetermined screwing, etc.

The node module card NMC is a card-shaped module in which the node module 140 (NM) and the node controller 140C (NC) are mounted on a predetermined card substrate (circuit board). Each of the NMCs is attached to a predetermined connector in backplane 220 in the enclosure 200, and the NMCs are laid side by side and supported in a position standing in a substantially vertical direction. The storage 101 is constituted by causing the plurality of NMCs to be electrically connected to each other through a connector.

The connection unit card CUC is a card-shaped module in which a connection unit CU is mounted on a predetermined card substrate. Each of the CUCs is contained in the enclosure 200 in a substantially horizontal direction from the rear side, and attached to a connector. The CUCs are arranged side by side. The plurality of CUCs may be electrically connected to each other through the connector.

The interface card IFC is a card-shaped module in which the interface module 120 is mounted on a predetermined card substrate. Each of the IFCs is contained in the enclosure 200 in a substantially horizontal direction from the rear side, and attached to a connector. The IFCs are arranged side by side. The plurality of IFCs may be electrically connected to each other through the connector.

The management module card MMC is a card-shaped module in which the management module (MM) 130 is mounted on a predetermined card substrate. Each of the MMCs is contained in the enclosure 200 in a substantially horizontal direction from the rear side, and attached to a connector. The MMCs are arranged side by side. The plurality of MMCs may be electrically connected to each other through the connector.

The console card COC is constituted of a display device such as a display or an input and output device such as a keyboard to perform input, output, etc., of each of the component members. The COC is arranged on the surface of the enclosure 200 in the front side.

The power supply unit PSU converts the external power voltage applied from the external power source VC through a power connector 204 into the predetermined DC voltage, and supplies converted power voltage VCO to each of the component members as described above. Here, two power supply units PSUs are contained in the enclosure 200 from the rear side. Further, each power supply unit PSU comprises a predetermined fan 203P. Air is sent by operating the fan 203P, and heat generated by the conversion, etc., can be radiated.

The auxiliary power supply units BBUs are arranged side by side in a substantially central portion in the enclosure 200. Here, three auxiliary power supply units BBUs are arranged as an example. As described above, the auxiliary power supply unit BBU receives the power voltage VCO from the power supply unit PSU, and accumulates power in itself. Then, if the power supply unit PSU is electrically disconnected from the external power source VC, the auxiliary power supply units BBUs function as auxiliary power for supplying predetermined auxiliary power voltage to each of the component members.

Eight fans 203, two fans for each line, are arranged in an end of the front side of the enclosure 200. Air is sent to the NMC, CUC, IFC and MMC arranged in a line by operating each of the fans 203, and heat generated in each of the component members can be radiated.

[2-1-2. Enclosure (Front Side)]

Next, an outer appearance on the front side of the enclosure 200 will be described with reference to FIG. 15.

As shown in the figure, a COC is arranged in the center of the front side of the enclosure 200. A power button, various LEDs and various connectors are provided in the COC.

Two fans 203 for sucking or exhausting air are provided on each of the right and left sides of the COC.

[2-1-3. Enclosure (Rear Side)]

Next, an outer appearance on the rear side of the enclosure 200 will be described with reference to FIG. 16. Two power supply units PSUs are arranged in the center of the rear side of the enclosure 200. The fan 203 for cooling the power supply unit PSU and the power connector 204 are provided in each power supply unit PSU.

Further, the CUC, IFC and MMC are arranged on each of the right and left sides of the rear side.

The CUC comprises 12 connectors 205, including six pairs, for connecting between the connectors and the outside. Here, regarding a standard for connectors 205, a connector conforming to the Ethernet (registered trademark) standard will be described as an example. However, an arbitrary standard can be adopted as the standard for connectors 205, if it is a standard which can be connected to a network.

The IFC comprises eight connectors 206, including four pairs, for connecting between the connectors and the outside (another enclosure). An arbitrary standard can be adopted as the standard for connectors 206. Here, LVDS is adopted as the interface 150 between the NMs 140, and LVDS is adopted as the standard for connectors 206.

The MMC comprises one connector 207 for connecting between the connector and the outside. An arbitrary standard can be adopted as the standard for connector 207.

[2-1-4. Enclosure (Layer Stack Side)]

Figure 18:
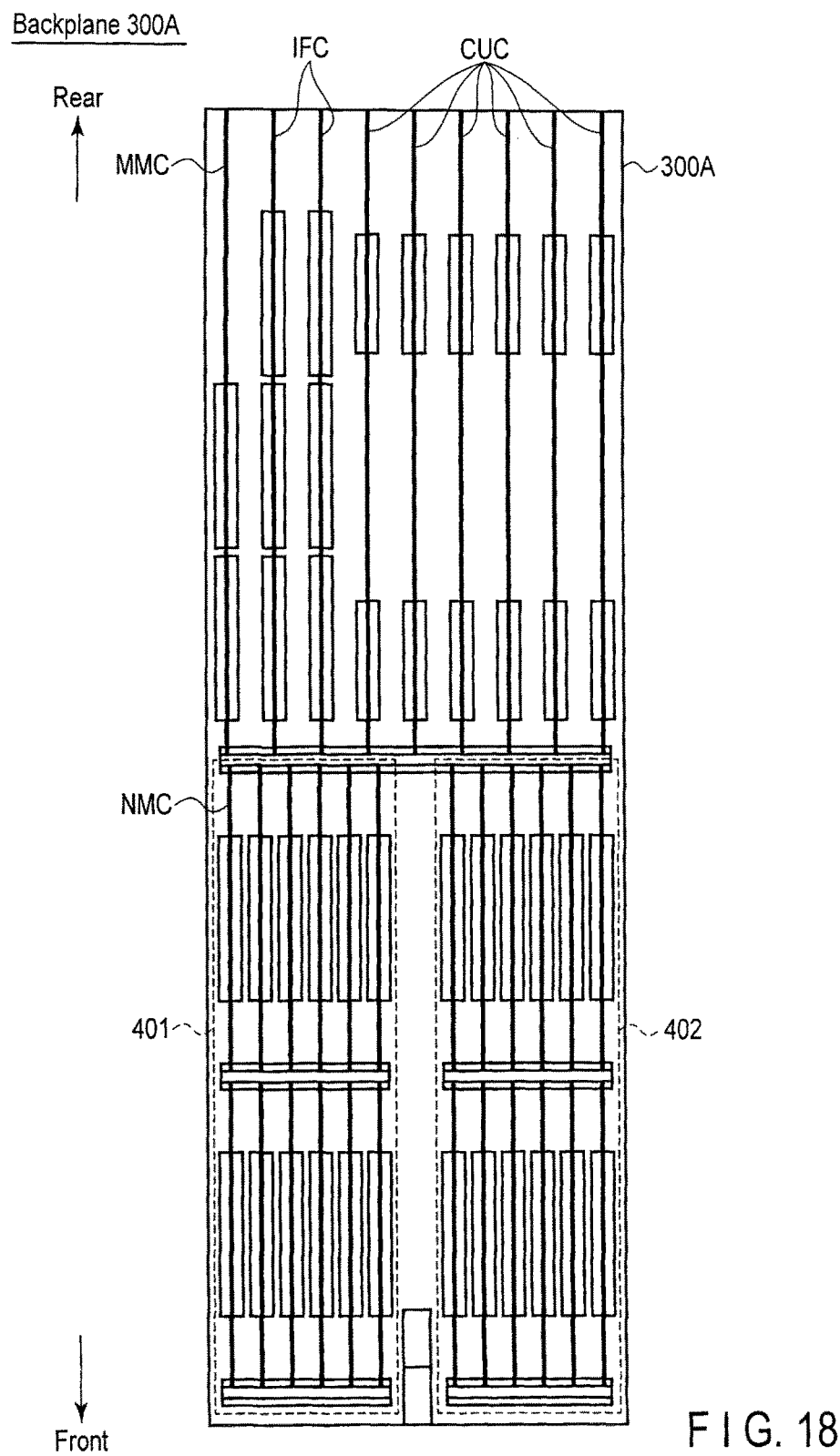
FIG. 18 shows a structural example of a backplane.

Next, an outer appearance on the lamination side of the enclosure 200 will be described with reference to FIGS. 17 and 18.

First, as shown in FIG. 17, a backplane 210 for power supply is contained in the central portion inside the enclosure 200. Two backplanes 300A and 300B are contained on the left and right sides of backplane 210 for power supply, respectively.

The CU 110, the interface module 120, the MM 130 and the NM 140 which are mounted on a card substrate are attached to each of backplanes 300A and 300B. Accordingly, each of them functions as one storage system 100. That is, two storage systems 100 can be contained in the enclosure 200.

It should be noted that the enclosure 200 is operable in a state where one of two backplanes 300A and 300B is contained. Further, if two backplanes 300A and 300B are contained in the enclosure 200, two backplanes 300A and 300B can be connected through connector 206. The connection allows the storages 101 included in the two storage systems 100 to be combined to be one storage 101 and to be used.

Two power supply units PSUs overlapped and arranged in a lamination direction (height direction) of the enclosure 200 are arranged on the rear side (Rear) of the enclosure 200 in backplane 210 for power supply. Further, three auxiliary power supply units BBUs are arranged side by side on the front side (Front) of the enclosure 200 in backplane 210 for power supply. Two power supply units PSUs generate an internal power source based on an external power source (commercial power source) supplied from the outside through the power connector 204, and supplies the generated internal power source to two backplanes 300A and 300B through backplane 210 for power supply. Three batteries BBUs are power sources for backup which are used for generating the internal power source when supply of the commercial power source stops due to a power failure, etc.

Next, backplane 300A which is one of the backplanes in FIG. 17 will be described with reference to FIG. 18.

As shown in the figure, the CU 110, the interface module 120, the MM 130 and the NM 140 are mounted on a card substrate, and attached to a slot of backplane 300A as a CUC, an IFC, an MMC and an NMC, respectively.

For example, one MMC, two IFCs and six CUCs are provided from the left on the rear side in backplane 300A. Further, 24 NMCs are disposed in two lines and provided on the front side in backplane 300A. The 24 NMCs are classified into a block (first block 401) consisting of 12 NMCs on the left side of the figure, and a block (second block 402) consisting of 12 NMCs on the right side of the figure. The classification is based on the provided position.

[2-1-5. Example of Use Form of Enclosure]

Figure 19:
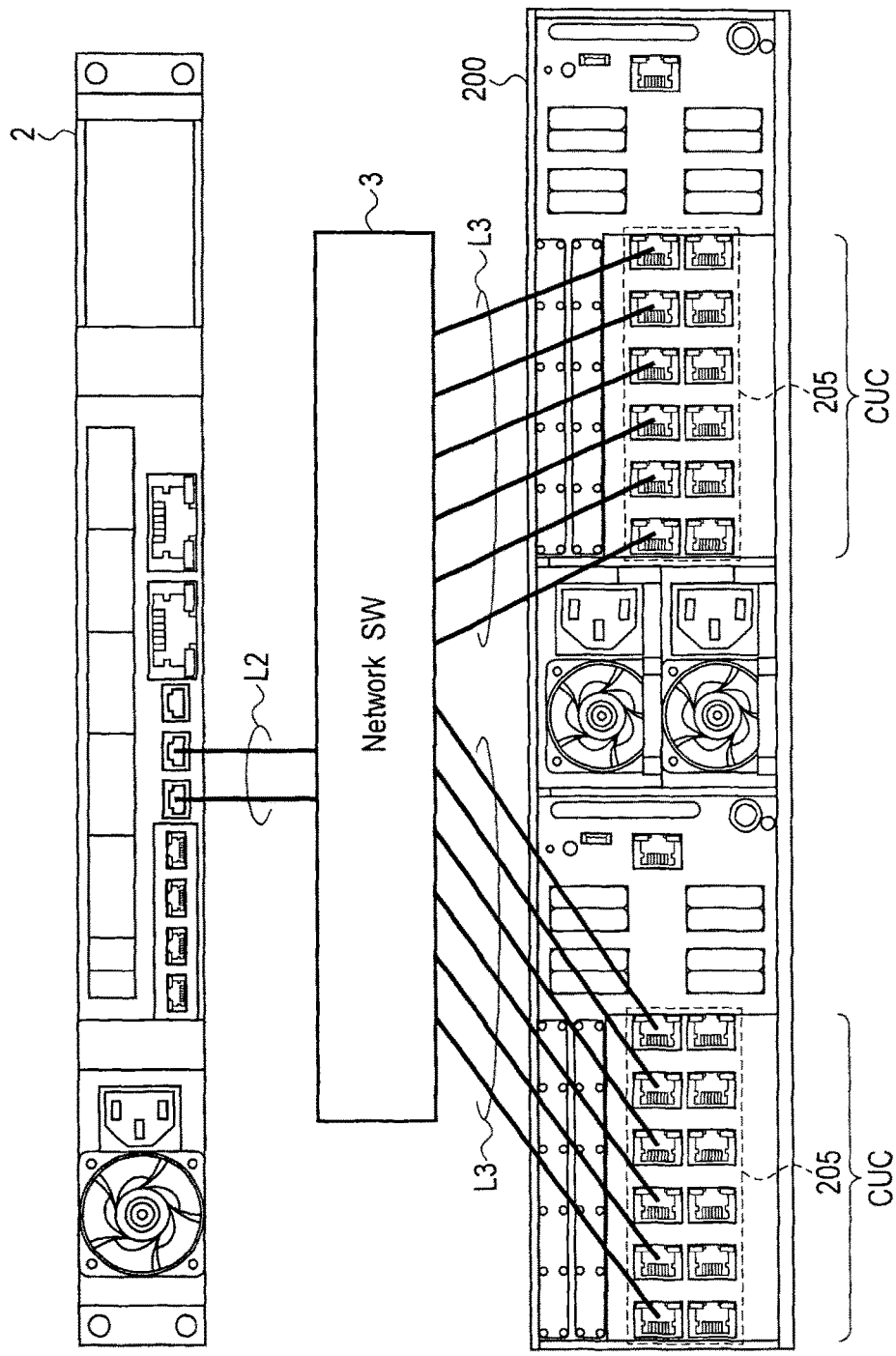
FIG. 19 shows an example of use forms of the enclosure according to the third embodiment.

Next, an example of a use form of the enclosure 200 will be described with reference to FIG. 19. FIG. 19 shows the example of the use form of the enclosure 200.

As shown in the figure, the enclosure 200 is electrically connected to a PC server 2 through connector 205 of the CUC and a network switch (Network SW) 3 by lines L2 and L3.

In the use form, the storage system 100 contained in the enclosure 200 interprets a request from the PC server 2 in the CUC, and accesses the storage 101. In the CUC, a server application is executed. The PC server 2 can transmit a request which can be accepted by the server application.

Here, connector 205 and the network switch 3 are connected for each CUC. However, the use form is not limited to this. An arbitrary CUC and the network switch 3 can be electrically connected.

[3. Structure of Each Card and Connection Relationship]

Next, each of the cards (NMC, IFC, CUC and MMC) constituting the storage system 100 contained in the enclosure 200 and a connection relationship thereof will be described.

[3-1. Nmc]

[3-1-1. Structure]

Figure 21:
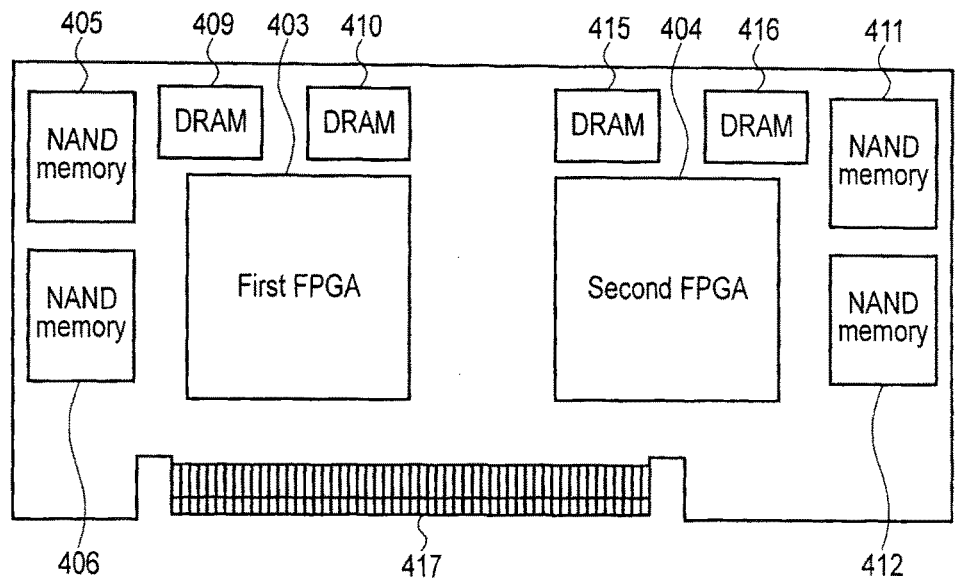
FIG. 21 is an overview diagram of the NM card.
Figure 22:
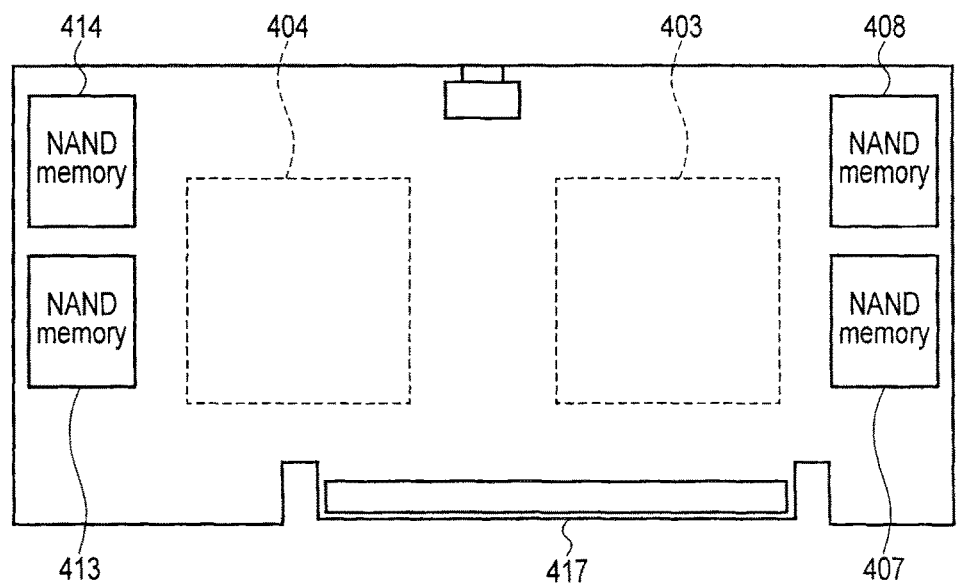
FIG. 22 is an overview diagram of the NM card.

First, the structure of the NMC will be described with reference to FIGS. 20 to 22. FIG. 20 is a block diagram showing the structure of the NMC. FIG. 21 is a block diagram showing one face of the NMC. FIG. 22 is a block diagram showing another face of the NMC.

As shown in FIG. 20, the NMC comprises first and second field-programmable gate arrays (FPGAs) 403 and 404, NAND memories 405 to 408 and 411 to 414, DRAMs 409, 410, 415 and 416, connector 417 and power controlled module 13N.

As shown in FIGS. 21 and 22, the first FPGA 403, NAND memories 405 and 406, DRAMs 409 and 410 and NAND memories 407 and 408 are positionally symmetrically provided with respect to the second FPGA 404, NAND memories 411 and 412, DRAMs 415 and 416 and NAND memories 414 and 415, respectively.

Connector 417 is provided in a position decentered from the center of the symmetry. Connector 417 is a connection mechanism physically and electrically connected to a slot on backplane 300. The NMC is electrically connected to other NMCs through interconnect formed in connector 417 and backplane 300, and can communicate with the other NMCs.

[First FPGA]

As shown in FIG. 20, the first FPGA 403 is connected to four NAND memories 405 to 408 and two DRAMs 409 and 410. The first FPGA 403 includes four NCs 140C. The four NCs 140C included in the first FPGA 403 use DRAMs 409 and 410 as the second memory 142.

Further, the four NCs 140C included in the first FPGA 403 use a different NAND memory of NAND memories 405 to 408 as the first memory 141. In other words, the first FPGA 403, NAND memories 405 to 408 and DRAMs 409 and 410 correspond to a group of NMs 140 consisting of the four NCs 140C.

[Second FPGA]

The second FPGA 404 is connected to four NAND memories 411 to 414 and two DRAMs 415 and 416. The second FPGA 404 includes four NCs 140C. The four NCs 140C included in the second FPGA 404 use DRAMs 415 and 416 as the second memory 142.

Further, the four NCs 140C included in the second FPGA 404 use a NAND memory of NAND memories 411 to 414 as the first memory 141. In other words, the second FPGA 404, flash memories 411 to 414 and DRAMs 415 and 416 correspond to a group of NMs 140 consisting of the four NMs 140C.

[Interface]

The first FPGA 403 is electrically connected to connector 417 by one PCIe interface 418 and six LVDS interfaces 419.

Similarly, the second FPGA 404 is electrically connected to connector 417 by one PCIe interface 418 and six LVDS interfaces 419.

The first FPGA 403 and the second FPGA 404 are electrically connected to each other by two LVDS interfaces 420.

The first FPGA 403 and the second FPGA 404 are electrically connected to connector 417 by I2C interface 421.

[Power Controlled Module 13N]

As shown in FIG. 20, power controlled module 13N controls the on-state/off-state of the internal power source VCC provided to the NMC based on control signal CS2 transmitted through connector 417 by second power controller 12A of the IFC. Power controlled module 13N controls the on-state/off-state of each internal power source VCC provided to the NCs 140C of the first and second FPGAs 403 and 404, NAND memories 405 to 408 and 411 to 414, and DRAMs 409, 410 and 415 to 412.

Further, in this example, control signal CS2 is transmitted through I2C interface 421 which is an internal network of the storage system 100. Whether the first and second FPGAs 404 and 403 (OS) of the NMC are present or not is confirmed by such transmission.

FIG. 20 shows an example in which power controlled module 13N is mounted on the NMC as a module different from each module mounted on the NMC, such as the first and second FPGAs 404 and 403; however, power controlled module 13N is not limited to this example, and obviously, may be mounted on the NMC in various forms. For example, power controlled module 13N may be mounted on the NMC as a module identical to the first and second FPGAs 404 and 403, etc. Furthermore, for example, each of structures constituting power controlled module 13N (control circuit 131, feed circuit 132, FET, etc.) may be mounted on the NMC as different modules. Further, the illustration of power controlled module 13N is omitted in FIGS. 21 and 22.

[3-1-2. NMC (Logical Connection Relationship Between NCs)]

Next, a logical connection relationship between the node controllers (NCs) 140C in the NMC will be described in more detail with reference to FIG. 23.

As shown in the figure, each of the NCs 140C comprises four interfaces in total. Each of the NCs 140C is connected to two other NCs 140C included in the same FPGA by two interfaces inside the FPGA.

Specifically, of the four NCs 140C included in the first FPGA 403, two NCs 140C are mutually connected to two NCs 140C of the four NCs 140C included in the second FPGA 404 by LVDS interface 420. As shown above, the NCs 140C are connected to each other, and the NMs 140C equivalent to eight NMs 140 of the NMC constitute a group of NMs 140 of four rows and two columns.

The other interfaces of each of the NCs 140C is an interface (LVDS interface 419) for connecting the NC 140C included in the FPGA on other NMCs (not shown). The NCs 140C located at the four corners of the arrangement of four rows and two columns comprise two LVDS interfaces 419, and the NCs 140C located in an outer edge portion other than the four corners comprise one LVDS interface 419. That is, the NMC comprises 12 LVDS interfaces 419 in total.

LVDS interface 419 is used for connection with other NMCs. The NC 140C located on the positive side (X+ direction) of the X direction can be mutually connected to the NC 140C on another NMC provided to be logically adjacent to the X+ direction. The NC 140C located on the negative side (X− direction) of the X direction can be mutually connected to the NC 140C on another NMC provided to be logically adjacent to the X-direction. The NC 140C located on the positive side (Y+ direction) of the Y direction can be mutually connected to the NC 140C on another NMC provided to be logically adjacent to the Y+ direction. The NC 140C located on the negative side (Y− direction) of the Y direction can be mutually connected to the NC 140C on another NMC provided to be logically adjacent to the Y-direction.

[Odd Group/Even Group]

In the third embodiment, 12 LVDS interfaces 419 in total of the NMC will be classified into two groups of an odd group and an even group and described.

LVDS interface 419 classified into the odd group will be hereinafter represented as LVDS interface 419a. LVDS interface 419 classified into the even group will be represented as LVDS interface 419b.

Figure 23:
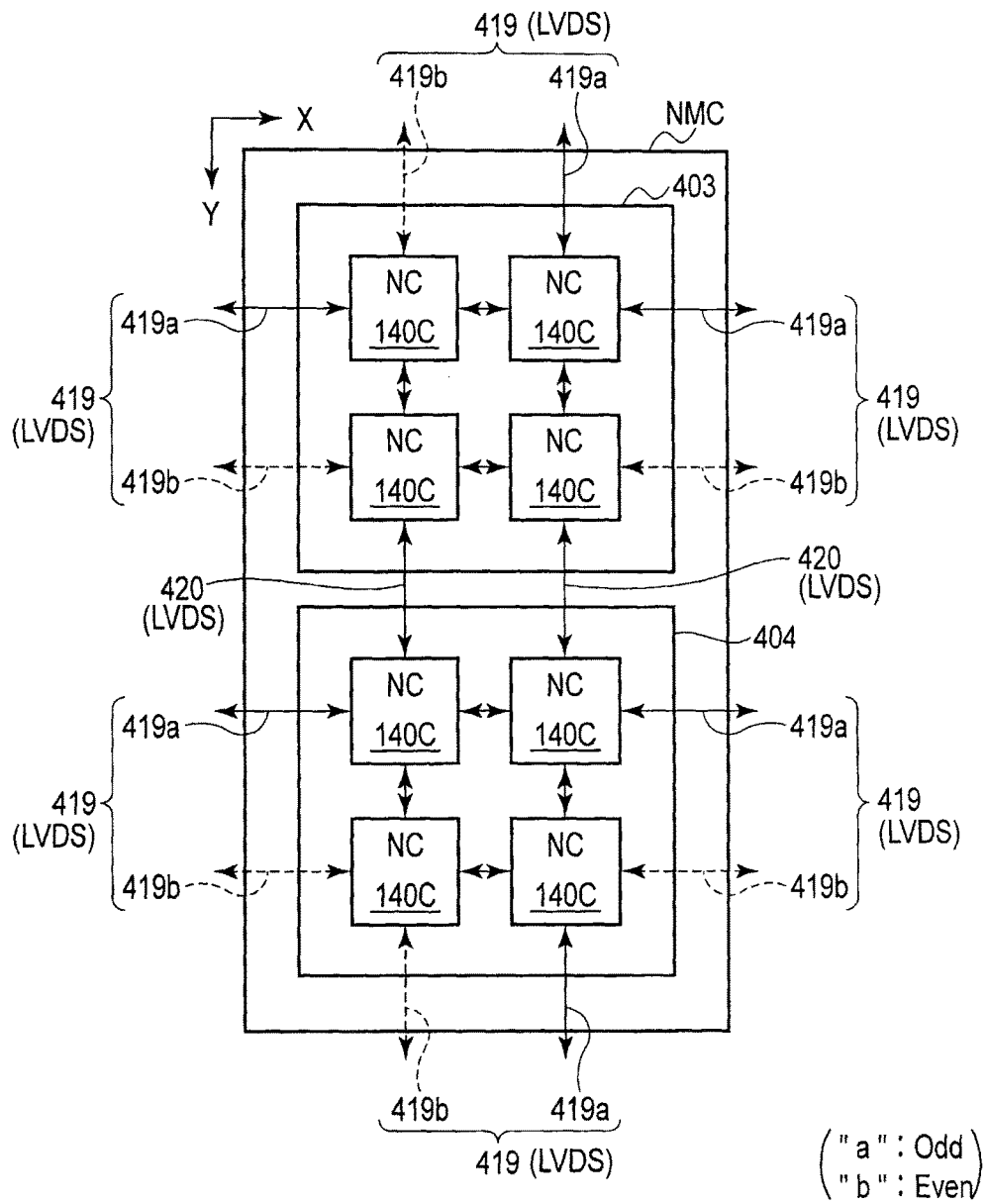
FIG. 23 shows a logical connection relationship between NCs.

In FIG. 23, a solid line indicates LVDS interface 419a belonging to the odd group. A dotted line indicates LVDS interface 419b belonging to the even group. As shown in the figure, 12 LVDS interfaces 419 are classified such that the number of LVDS interfaces in the odd group and that of LVDS interfaces in the even group are equal in each of the X+ direction, X-direction, Y+ direction and Y− direction.

[3-2. IFC]

[3-2-1. Structure]

Next, the structure of the IFC will be described with reference to FIG. 24. FIG. 24 is a block diagram showing the structure of the IFC.

As shown in the figure, the IFC comprises connectors 509 and 206, LVDS buffers 501 and 502, capacitors 503 and 504 and second power controller 12A.

Connector 509 is a connection mechanism physically and electrically connected to a slot on backplane 300. The IFC is electrically connected to the NMC and each card, etc., through interconnect formed in connector 509 and backplane 300.

As described above, connector 206 is a connection mechanism for electrically connecting the storage system 100 contained in another enclosure 200 through another IFC. Connector 206 includes four connectors 505 to 508. It should be noted that connector 505 and connector 506 comprise an attachment/detachment mechanism in which attachment and detachment can be simultaneously performed, and connector 507 and connector 508 comprise an attachment/detachment mechanism in which attachment and detachment can be simultaneously performed.

Connector 505 is an LVDS cable connector in which terminals of LVDS interfaces 419 of the X+ direction are collected. Connector 506 is an LVDS cable connector in which terminals of LVDS interfaces 419 of the X− direction are collected. Connector 507 is an LVDS cable connector in which terminals of LVDS interfaces 419 of the Y+ direction are collected. Connector 508 is an LVDS cable connector in which terminals of LVDS interfaces 419 of the Y− direction are collected.

LVDS interface 419 of the X+ direction and LVDS interface 419 of the X− direction are connected to connector 505 and connector 506, respectively, through connector 509, LVDS buffer 501 and capacitor 503.

LVDS interface 419 of the Y+ direction and LVDS interface 419 of the Y− direction are connected to connector 507 and connector 508, respectively, through connector 509, LVDS buffer 502 and capacitor 504.

As described above, two IFCs are attached to each of the backplanes 300. One of the two IFCs attached to each backplane 300 is obtained by collecting only the odd group, and the other is obtained by collecting only the even group.

[Second Power Controller 12A]

As shown in FIG. 24, the IFC according to the third embodiment comprises second power controller 12A. Second power controller 12A latches control signal CS1 transmitted from the first power controller 11 of the MMC through connector 509. Furthermore, second power controller 12A transmits control signal CS2 having a value identical to that of control signal CS1 to power controlled modules 13N, 13C, 13P and 13B at timing of a signal edge of rising of the clock signal CK transmitted from the first power controller 11.

It should be noted that FIG. 24 shows an example in which second power controller 12A is mounted on the IFC as a module different from each module mounted on the IFC such as LVDS buffers 501 and 502. However, second power controller 12A is not limited to this example, and obviously, may be mounted on the IFC in various forms. For example, second power controller 12A may be mounted on the NMC as a module identical to LVDS buffers 501, 502, etc. Furthermore, for example, each of the structures constituting second power controller 12A (second feed circuit 121A, latch circuit 122A, etc.) may be mounted as different modules. The online replacement can be easily performed by detaching or attaching the IFC on which second power controller 12A is mounted from or to connector 509 for online period T3 in any of the mounting forms.

Further, as described above, one of the two IFCs attached to each backplane 300 is obtained by collecting only the odd group, and the other is obtained by collecting only the even group. FIG. 24 shows a case where second power controller 12A is mounted on the one of the IFCs obtained by collecting only the odd group. That is, second power controller 12B is mounted on the other IFCs obtained by collecting only the even group. Since the structure and operation of second power controller 12B are similar to those of second power controller 12A, detailed description thereof will be omitted.

[3-2-2. Connection Relationship Between IFC and Nmc]

Next, a connection relationship between an IFC and an NMC will be described with reference to FIG. 25. FIG. 25 shows an electric connection relationship between the IFC and the NMC. Here, connectors of the odd group are denoted by "a" at the end of the reference numbers, and connectors of the even group are denoted by "b" at the end for distinction.

As shown in FIG. 25, two NMCs physically adjacent to the X direction are mutually connected by one LVDS interface 419*a* and one LVDS interface 419*b* in each of a first block 401 and a second block 402.

Two NMCs physically adjacent to the Y direction are mutually connected by two LVDS interfaces 419*a* and two LVDS interfaces 419*b* in each of the first block 401 and the second block 402.

The NMC attached to the lower portion of the first block 401 is connected in one-to-one relationship to the NMC attached to the lower portion of the second block 402 by one LVDS interface 419*a* and one LVDS interface 419*b*.

The NMC which is attached to the lower portion of the first block 401 and located at the i-th from the left side of the figure is connected in one-to-one relationship to the NMC which is attached to the lower portion of the second block 402 and located at the i-th from the right side of the figure.

[Logical Connection Relationship Between NMC and IFC]

The physical connection as described above causes the definition of the X direction and that of the Y direction to logically differ between the first block 401 and the second block 402. That is, in the first block 401, the right direction of the figure corresponds to the X+ direction. In the second block 402, the left direction of the figure corresponds to the X+ direction. In the first block 401, the upper direction of the figure corresponds to the Y+ direction. In the second block 402, the lower direction of the figure corresponds to the Y+ direction.

Thus, of LVDS interfaces 419 in the X+ direction of the NMC attached in the right end of the first block 401 and the NMC attached in the left end of the second block 402, LVDS interface 419*a* belonging to the odd group is connected to connector 505*a*.

Of LVDS interfaces 419 in the X+ direction of the NMC attached in the right end of the first block 401 and the NMC attached in the left end of the second block 402, LVDS interface 419*b* belonging to the even group is connected to connector 505*b*.

Of LVDS interfaces 419 in the X− direction of the NMC attached in the left end of the first block 401 and the NMC attached in the right end of the second block 402, LVDS interface 419*a* belonging to the odd group is connected to connector 506*a*.

Of LVDS interfaces 419 in the X− direction of the NMC attached in the left end of the first block 401 and the NMC attached in the right end of the second block 402, LVDS interface 419*b* belonging to the even group is connected to connector 506*b*.

Of LVDS interfaces 419 in the Y+ direction of the NMC attached in the upper portion of the first block 401, LVDS interface 419*a* belonging to the odd group is connected to connector 507*a*.

Of LVDS interfaces 419 in the Y+ direction of the NMC attached in the upper portion of the first block 401, LVDS interface 419b belonging to the even group is connected to connector 507b.

Of LVDS interfaces 419 in the Y− direction of the NMC attached in the upper portion of the second block 402, LVDS interface 419a belonging to the odd group is connected to connector 508a.

Of LVDS interfaces 419 in the Y− direction of the NMC attached in the upper portion of the second block 402, LVDS interface 419b belonging to the even group is connected to connector 508b.

[3-3. CUC (Structure)]

Next, the structure of a CUC will be described with reference to FIG. 26. FIG. 26 is a block diagram showing the structure of the CUC.

As shown in the figure, the CUC comprises connector 611, first and second processors 601 and 602, DRAMs 603 and 604, two connectors 205 and SD sockets 609 and 610.

Connector 611 is a connection mechanism physically and electrically connected to a slot on backplane 300. The CUC can communicate with an MMC and an NMC which are different cards through interconnect formed in connector 611 and backplane 300.

Each of the respective first and second processors 601 and 602 functions as individual CU 110 by executing a program. In other words, one CUC corresponds to two CUs 110.

The first processor 601 is connected to DRAM 603, and uses DRAM 603 as a work area. The first processor 601 is connected to SD socket 609. MicroSD card 612 in which a program executed by the first processor 601 is prestored is connected to SD socket 609.

The first processor 601 is connected to one of two connectors 205 by an interface conforming to the Ethernet standard 606. The first processor 601 is connected to the outside through connector 205. Further, the first processor 601 is connected to connector 611 by two PCIe interfaces 605. Further, the first processor 601 is connected to connector 611 by one interface 607 conforming to the Ethernet standard. Further, the first processor 601 is connected to connector 611 by one I2C interface 608. The first processor 601 is connected to the NMC and MMC through connector 611.

Similarly, the second processor 602 is connected to DRAM 604, and uses DRAM 604 as a work area. The second processor 602 is connected to SD socket 610. MicroSD card 613 in which a program executed by the second processor 602 is prestored is connected to SD socket 610.

Similarly, the second processor 602 is connected to one of two connectors 205 by an interface conforming to the Ethernet standard 606. Further, the second processor 602 is connected to connector 611 by two PCIe interfaces 605. The second processor 602 is connected to the outside through connector 205. Further, the second processor 602 is connected to connector 611 by one interface 607 conforming to the Ethernet standard. Further, the second processor 602 is connected to connector 611 by one I2C interface 608. The second processor 602 is connected to the NMC and MMC through connector 611.

[Power Controlled Module 13C]

As shown in FIG. 26, the CUC comprises power controlled module 13C. Power controlled module 13C controls the on-state/off-state of the internal power source VCC provided to the CUC based on control signal CS2 transmitted through connector 611 by second power controller 12A of the IFC. In this example, power controlled module 13C controls the on-state/off-state of the internal power source VCC provided to each of circuits of the first and second processors 601 and 602, DRAMs 603 and 604 and the CUC based on control signal CS2.

Further, in this example, control signal CS2 is transmitted through Ethernet (Gigabit Ethernet [GbE]) which is an internal network of the storage system 100. Thus, control signal CS2 may be transmitted by an interface conforming to the Ethernet standard 607. Whether the first and second processors 601 and 602 (OS) of the CUC are present or not is confirmed by such transmission.

FIG. 26 shows an example in which power controlled module 13C is mounted on the CUC as a module different from each module mounted on the CUC such as the first and second processors 601 and 602. However, power controlled module 13C is not limited to this example, and obviously, may be mounted on the CUC in various forms. For example, power controlled module 13C may be mounted on the CUC as a module identical to the first and second processors 601, 602, etc. Furthermore, for example, each of structures constituting power controlled module 13C (control circuit 131, feed circuit 132, FET, etc.) may be mounted as different modules.

[3-4. MMC]

[3-4-1. Structure]

Next, the structure of an MMC will be described with reference to FIG. 27. FIG. 27 is a block diagram showing the structure of the MMC.

As shown in the figure, the MMC comprises connector 720, a BMC chip 701, a third processor 702, DRAMs 703 and 704, a switch 705, connector 207 and SD sockets 706 and 707.

Connector 720 is a connection mechanism physically and electrically connected to a slot on backplane 300. An MMC 700 communicates with the NMC and CUC which are different cards through interconnect formed in connector 720 and backplane 300.

[BMC Chip]

The BMC chip 701 is a chip for realizing a function of the BMC. The BMC chip 701 is connected to DRAM 703, and uses DRAM 703 as a work area. The BMC chip 701 is connected to SD socket 706. The BMC chip 701 can record various types of monitoring data in microSD card 716 connected to SD socket 706. The BMC chip 701 is connected to connector 207 by interface 708 conforming to the Ethernet standard, and can communicate with the outside through connector 207. Further, the BMC chip 701 comprises the first power controller 11.

[First Power Controller 11]

As shown in FIG. 27, the first power controller 11 transmits control signal CS1 and the clock signal CK to second power controllers 12A and 12B through connector 720, etc., based on a state of the power voltage of power controlled modules 13N, 13C, 13P and 13B mounted on the NMC, the CUC, the power supply unit PSU, the auxiliary power supply unit BBU, etc., and causes second power controllers 12A and 12B to latch (hold) control signal CS1. The first power controller 11 will be described more specifically below for each card.

1) Case of CUC, NMC, Etc.

If a subject which monitors the power state is the CUC, NMC, etc., the first power controller 11 communicates with power controlled modules 13N and 13C mounted on the NMC and CUC through the internal network, and detects the state of the power voltage of the NMC and CUC.

Then, the first power controller 11 performs existence confirmation of the OS in the NMC and CUC (confirmation of whether a power source is turned on or not, and whether the OS is normally started or not). In the confirmation, if a response is not received from the NMC and CUC, the first power controller 11 determines that the NMC and CUC need to be restarted or replaced due to a breakdown.

Thus, the first power controller 11 indicates information that a response from a target module (NMC and CUC) is not present to the outside through connector 207 based on the determination. As a result, a blocking instruction of the target module (NMC and CUC) is indicated from the outside to the first power controller 11 of the BMC chip 701 through connector 207.

The first power controller 11 transmits control signal CS1 based on the blocking instruction of the power source from the outside, and causes second power controllers 12A and 12B to latch control signal CS1. Then, regarding the NMC and CUC, supply of the internal power source VCC is blocked by control signal CS2 having a value identical to that of control signal CS1 transmitted from second power controllers 12A and 12B, and the power voltage is turned to be off-state. The control allows safe restart and replace of the CUC and NMC to be performed.

2) Case of PSU

If a subject which monitors the power state is the power supply unit PSU (PSU-1, PSU-2), the first power controller 11 does not use a network for performing the existence confirmation, unlike the case of the CUC and NMC.

Then, the power supply unit PSU controls a DC output (internal module power output) by the external power source VC by the control circuit 131 of the own device PSU. The control circuit 131 transmits a predetermined mount signal or failure detection signal (signal transmitted when the power supply unit PSU itself detects internal abnormality) to the CPU 113 of the first power controller 11.

Then, the CPU 113 of the first power controller 11 transmits control signal CS1 based on the transmitted mount signal or failure detection signal, and causes second power controllers 12A and 12B to latch control signal CS1. Then, regarding the power supply unit PSU, the external power source VC is turned to be on-state/off-state by control signal CS2 having a value identical to that of control signal CS1 transmitted from second power controllers 12A and 12B. The control allows safe restart, replace, etc., of the power supply unit PSU to be performed. For example, the control allows either of power supply units PSU-1 and PSU2 to be safely online replaced.

3) Case of BBU

Similarly, if a subject which monitors the power state is the auxiliary power supply unit (battery module) BBU, the first power controller 11 does not use a network for performing the existence confirmation.

Then, the auxiliary power supply unit BBU controls the on-state/off-state of the power voltage VCO provided from the power supply unit PSU by the control circuit 131 of the own device BBU. Similarly, the control circuit 131 transmits a predetermined mount signal or failure detection signal (signal transmitted when the auxiliary power supply unit BBU itself detects internal abnormality) to the CPU 113 of the first power controller 11.

Then, the CPU 113 of the first power controller 11 transmits control signal CS1 based on the transmitted mount signal or failure detection signal, and causes second power controllers 12A and 12B to latch control signal CS1. Then, regarding the auxiliary power supply unit BBU, the power voltage VCO is turned to be on-state/off-state by control signal CS2 having a value identical to that of control signal CS1 transmitted from second power controllers 12A and 12B. The control allows safe restart, replace, etc., of the auxiliary power supply unit BBU to be performed. For example, the control allows any of three auxiliary power supply units BBUs to be safely online replaced.

[Third Processor]

The third processor 702 executes NM control processing on the storage 101 based on a program. The third processor 702 is connected to DRAM 704, and can use DRAM 704 as a work area. The third processor 702 is connected to SD socket 707. MicroSD card 717 in which a program executed by the third processor 702 is prestored is connected to SD socket 707.

The switch 705 is connected to connector 720 by 12 interfaces 710, connected to the third processor 702 by one interface 711, and connected to the BMC chip 701 by one interface. Each interface connected to the switch 705 conforms to the Ethernet standard. 12 interfaces 710 are connected to each of processors (first processor 601, second processor 602) mounted on the CUC through connector 720 and backplane 300. The switch 705 relays communication between the first processor 601, the second processor 602 and the third processor 702 and the BMC chip 701. The BMC chip 701 can acquire information generated by each processor through the switch 705.

Further, the BMC chip 701 is connected to connector 720 by I2C interface 712. I2C interface 712 is branched into I2C interface 713 halfway. I2C interface 713 into which I2C interface 712 is branched is connected to the third processor 702. The terminal on the side of connector 720 of I2C interface 712 is connected to the first processor 601, the second processor 602, the first FPGA 403 and the second FPGA 404 through backplane 300 and connectors of various cards. The BMC chip 701 monitors the first processor 601, the second processor 602, the first FPGA 403 and the second FPGA 404 through I2C interface 712. Monitoring data transmitted from the first processor 601, the second processor 602, the first FPGA 403 and the second FPGA 404 is also referred to from the third processor 702 through I2C interface 713. The third processor 702 can execute the NM control processing using the monitoring data.

The third processor 702 is connected to connector 720 by PCIe interface 714. The terminal on the side of connector 720 of PCIe interface 714 is connected to one NMC through backplane 300. The third processor 702 transmits a packet with respect to arbitrary NC 140C to PCIe interface 714, and receives a packet from arbitrary NC 140C through PCIe interface 714.

[3-4-2. Connection Relationship Between MMC, CUC and NMC]

Figure 28:
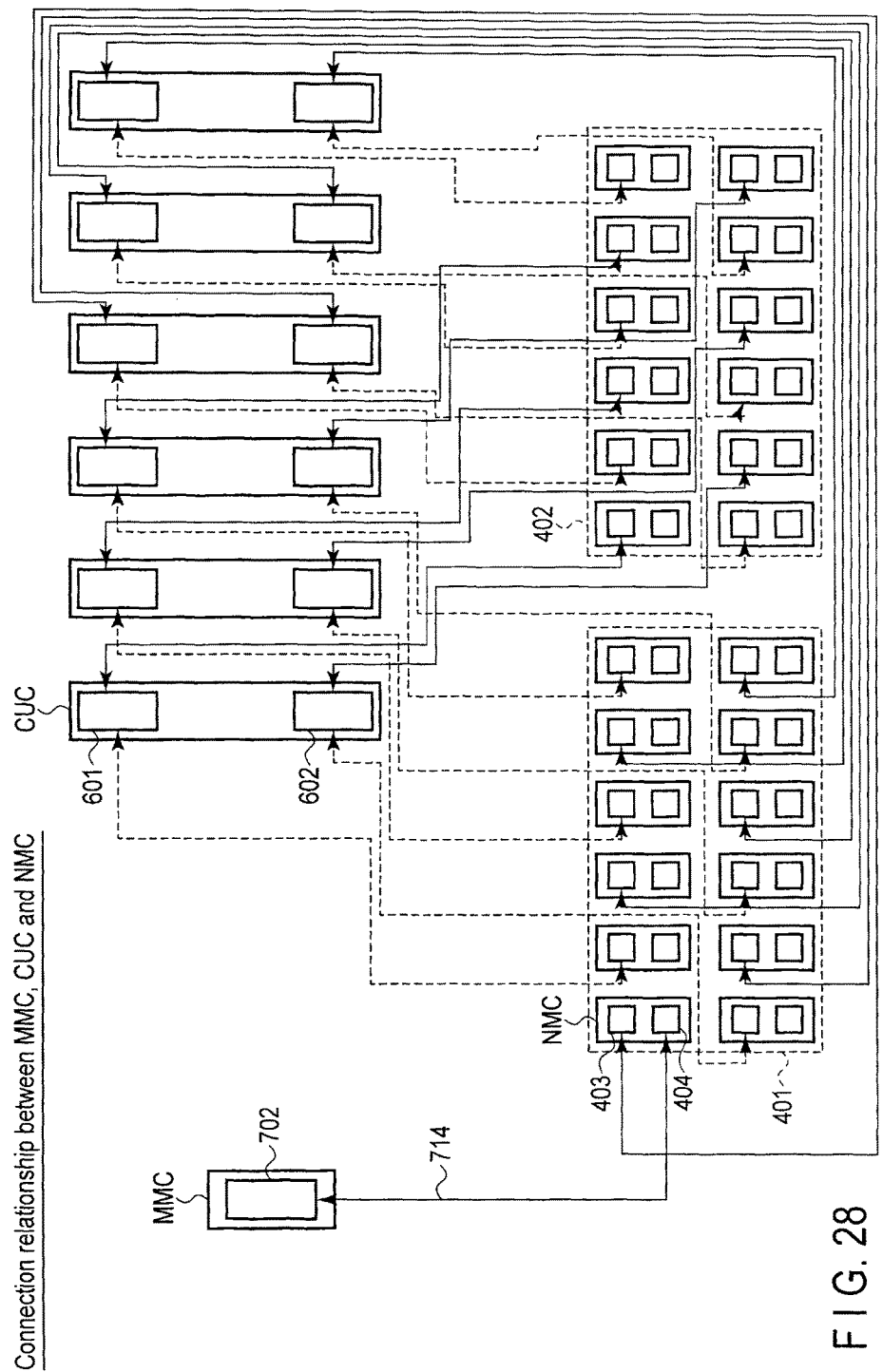
FIG. 28 shows a connection relationship between the NM card, the CU card and the MM card.

Next, a connection relationship between MMC, CUC and NMC will be described with reference to FIG. 28. FIG. 28 shows the connection relationship between the NMC, the CUC and the MMC. All the connections shown in the figure are based on the PCIe interfaces. Further, the connection relationship shown in the figure is realized by interconnect in each card and that formed on backplane 300.

As described above, each CUC comprises four PCIe interfaces 605, and each NMC comprises two PCIe interfaces 418. Four PCIe interfaces 605 are used for connections with different NMCs. Thus, each CUC is connected to four NMCs. Regarding each NMC, one of two PCIe interfaces 418 is used for a connection with the CUC. Here, PCIe interface 418 of the first FPGA 403 is used for a connection with the CUC.

Each of the first processors 601 of three CUCs on the left side of the figure is connected to a different NMC attached in the upper portion of the first block 401 and a different NMC attached in the upper portion of the second block 402. Further, each of the second processors 602 of three CUCs on the left side of the figure is connected to a different NMC attached to the lower portion of the first block 401 and a different NMC attached to the lower portion the second block 402.

Each of the first processors 601 of three CUCs on the right side of the figure is connected to both a different NMC attached in the upper portion of the first block 401 and a different NMC attached in the upper portion of the second block 402. Further, each of the second processors 602 of three CUCs on the right side of the figure is connected to both a different NMC attached to the lower portion of the first block 401 and a different NMC attached to the lower portion of the second block 402.

As shown above, each CUC is connected to both the NMC belonging to the first block 401 and the NMC belonging to the second block 402. Accordingly, even if the NMC is attached only to either of the first block 401 and the second block 402, each CUC can exhibit a function as CU 11 for the attached NMC. Further, it can be used in a state where an arbitrary number of CUCs are attached, where the number being one to six, regardless of whether the NMC is attached to both of the first block 401 and the second block 402 or not.

As will be described next, since the MMC is connected only to one NMC belonging to the first block 401, the enclosure 200 is used in a state where the NMC is connected to at least the first block 401. If the MMC is connected to an arbitrary NMC belonging to the second block 402, the enclosure 200 can be used in a state where the NMC is attached only to the second block 402.

The MMC comprises one PCIe interface 714. PCIe interface 714 is used; thus, the MMC is connected to one NMC. Here, in the NMC, PCIe interface 418 of the second FPGA 404 is used for a connection with the MMC. Further, the MMC is connected to the NMC attached to the leftmost side in the upper portion of the first block 401. The MMC can transmit and receive a packet through PCIe interface 714.

[3-4-3. Connection Relationship Between MMC and CUC]

Figure 29:
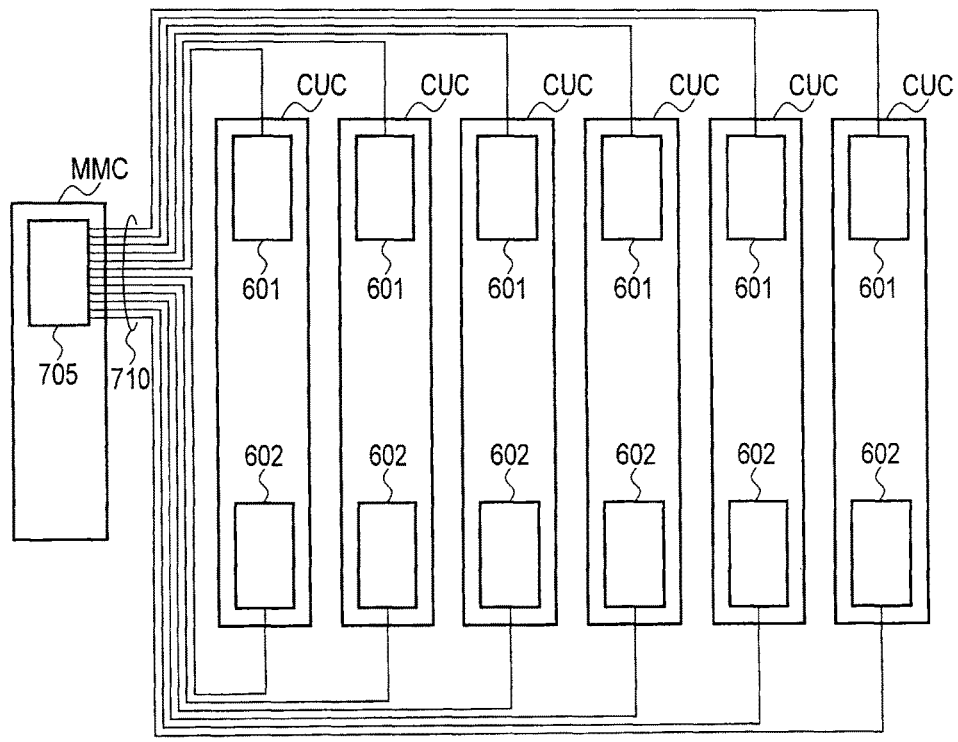
FIG. 29 shows a connection relationship between the CU card and the MM card.

Next, a connection relationship between the MMC and CUC will be described with reference to FIG. 29. FIG. 29 shows the connection relationship between the CUC and MMC.

Here, the illustration of the connection by the I2C interface is omitted. A connection relationship by an interface conforming to the Ethernet standard is shown. The shown connection relationship is realized by interconnect in each card and that formed on backplane 300.

The MMC comprises 12 interfaces 710 conforming to the Ethernet standard. Further, each CUC comprises two interfaces 607 conforming to the Ethernet standard. Two interfaces 710 are used for each CUC; thus the MMC is connected to six CUCs.

[4. Connection Example for Scaling Out]

Next, a connection example for scaling out the storage 101 will be described with reference to FIGS. 30 to 32.

Here, a connection example (first connection example) for constructing one storage 101 using two storage systems 100 of one enclosure 200 will be described. To identifying a plurality of storage system 100, an alphabet is added to the end of the reference number of each of the storage systems 100.

Figure 30:
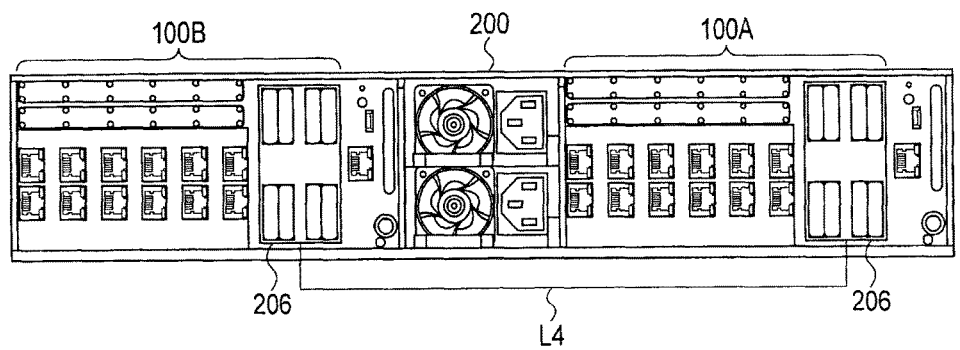
FIG. 30 shows a group of connectors used in a first connection example.

FIG. 30 shows a group of connectors used in the first connection example. FIG. 31 shows a specific connection relationship by the first connection example. FIG. 32 shows the storage 101 logically constructed by the first connection example.

As shown in FIG. 30, in the first connection example, connector 206 of one of the two storage systems 100 of one enclosure 200 (storage system 100A) and connector 206 of the other (storage system 100B) are connected to each other.

Figure 31:
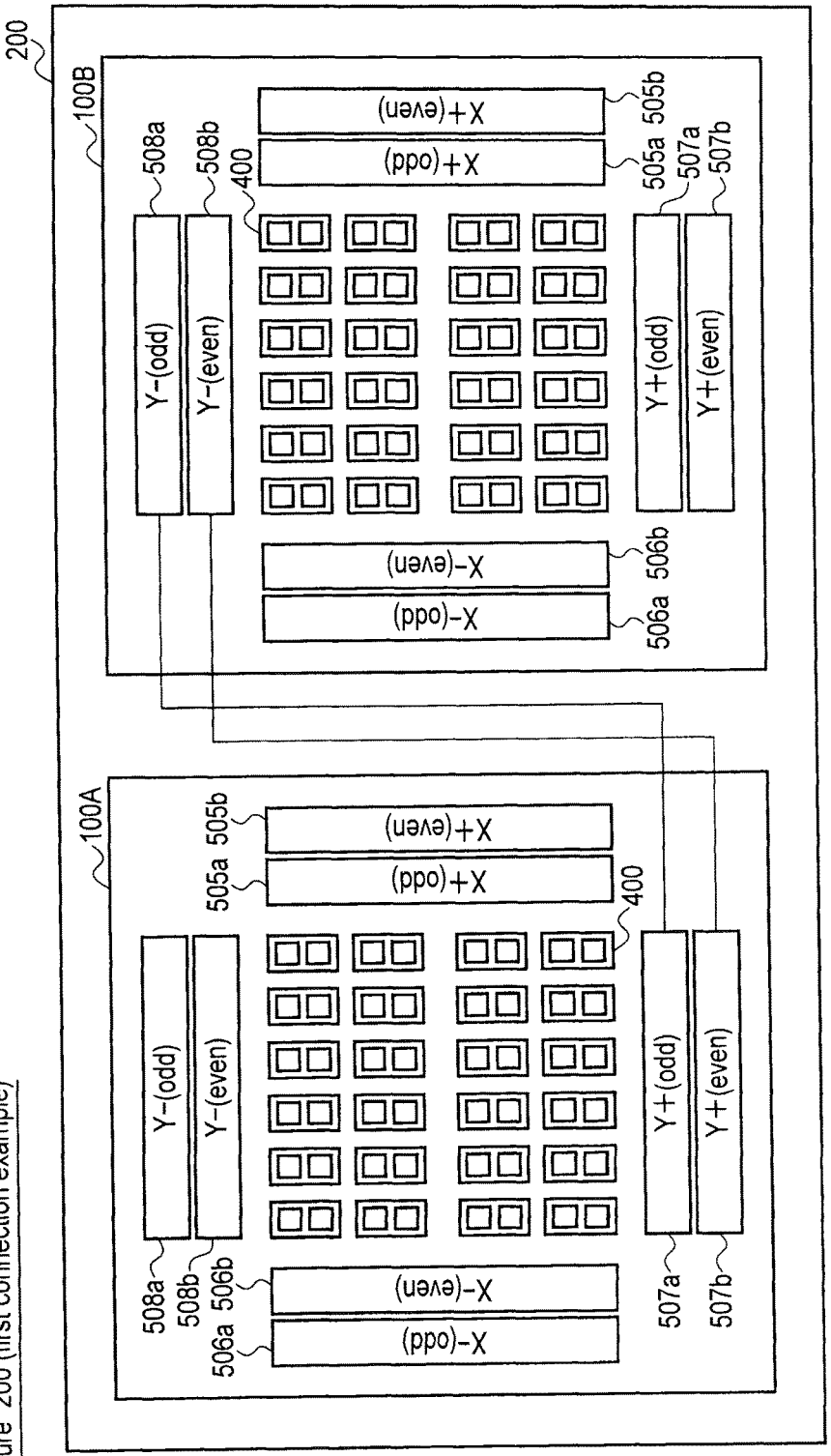
FIG. 31 shows a specific connection relationship by the first connection example.

Specifically, as shown in FIG. 31, connector 507a of storage system 100A and connector 508a of storage system 100B are connected. Further, connector 507b of storage system 100A and connector 508b of storage system 100B are connected. By these connections, the storage 101B of storage system 100B is connected in the Y+ direction of the storage 101A of storage system 100A.

As a result, as shown in FIG. 32, storage 101A of storage system 100A and storage 101B of storage system 100B are combined with each other, and new storage 101 is logically constituted. The new storage 101 is constituted by disposing six NMCs in the X direction and disposing eight NMCs in the Y direction.

Although the two storages 101 are connected in the Y direction in the first connection example, the structure is not limited to this. For example, the two storages 101 can also be connected in the X direction.

[5. Advantageous Effects]

As described above, according to the third embodiment, at least advantages similar to the above advantage (1) to (5) can be obtained. Furthermore, at least advantage (6) shown below can be obtained by the storage system 100 according to the third embodiment.

(6) Reliability and convenience of the storage system can be improved.

Here, the storage system 100 according to the third embodiment is utilized for an information processing system such as a cloud computing system, etc. Thus, performing maintenance of the storage system 100 causes deterioration in service of the information processing system, and the reliability and convenience are decreased.

Then, some memory modules constituting the storage system 100 are made redundant. For example, as shown in FIG. 11, the storage 101 is made redundant by a RAID. This allows the whole storage system 100 to continue a normal operation without stopping the operation, even if a failure occurs in part of the storage 101.

Furthermore, the memory system 100 according to the third embodiment comprises the power control system 10 according to the second embodiment.

Thus, as well as in the case shown in FIG. 7, the MMC on which the first power controller 11 is mounted can be temporarily removed from a card substrate, etc., for online period T3. Similarly, one of two IFCs on which second power controllers 12A and 12B are mounted can be temporarily removed from a card substrate, etc., for online period T3. In other words, the storage system 100 can normally continue the operation for online period T3 even in a state where the MMC or one of the two IFCs is not temporarily present.

That is, even in a state where the MMC and one of the two IFCs are online replaced, the storage system 100 according to the third embodiment can control the power sources of the NMC, CUC, PSU and BBU on which power controlled modules 13N, 13C, 13P and 13B are mounted by controlling control signal CS2 of the other one of the two IFCs, as described above.

As a result, while the NMC, CUC, PSU and BBU on which power controlled modules 13N, 13C, 13P and 13B are mounted are controlled by controlling only one of second power controllers 12A and 12B, online replacement can be easily performed by re-mounting an MMC and an IFC including a structure or a function similar to that of a removed MMC and IFC on a card substrate.

As described above, the storage system 100 according to the third embodiment allows reliability and convenience to be improved.

Similarly, the other one of the two IFCs on which second power controllers 12A and 12B are mounted can be online replaced. Further, in the third embodiment, a power function is cited as an example of important functions. However, obviously, the important functions are not limited to the power function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power control system comprising:
    a first power control circuit configured to generate a control signal that controls the power supply of a power controlled circuit, to output a first control signal based on the generated control signal, and to output a second control signal based on the generated control signal; and
    a second power control circuit configured to latch the first control signal output from the first power control circuit, and to output the latched first control signal as a third control signal, wherein:
    a fourth control signal is supplied to the power controlled circuit, which fourth control signal is a signal of OR logic formed by connecting the second control signal output from the first power control circuit and the third control signal output from the second power control circuit.

2. The power control system of claim 1, wherein the first power control circuit is configured to transmit the second control signal to the power controlled circuit, and to transmit a clock signal to the second power control circuit to cause the second power control circuit to latch the first control signal.

3. The power control system of claim 2, wherein:
    the first power control circuit is configured to transmit the clock signal to the second power control circuit; and
    the second power control circuit is configured to latch the first control signal at a predetermined timing of the transmitted clock signal.

4. The power control system of claim 1, further comprising a power supply unit configured to supply a predetermined power voltage to the first power control circuit, the second power control circuit, and the power controlled circuit.

5. The power control system of claim 1, wherein the first power control circuit is replaceable with a power control circuit including a similar structure or function for an online period of the power control system.

6. The power control system of claim 1, further comprising at least one redundant power control circuit including a structure similar to the structure of the second power control circuit.

7. The power control system of claim 6, wherein the second power control circuit and the at least one redundant power control circuit are replaceable with a power control circuit including a similar structure or function for an online period of the power control system.

8. A storage system comprising the power control system of claim 1, wherein the storage system is utilized in an information processing system.

9. The storage system of claim 8, further comprising:
    a memory comprising a plurality of memory units, each of the plurality of memory units comprising a non-volatile memory and a controller configured to control data transfer of the non-volatile memory, the plurality of memory units being capable of transferring data between each other;
    a connection circuit configured to connect the memory to outside;
    an interface circuit configured to extend the memory; and
    a management circuit configured at least to execute monitoring of power voltage for the memory, the connection circuit and the interface circuit.

10. The storage system of claim 9, wherein the memory, the connection circuit, the interface circuit, and the management circuit are card-shaped modules contained in an enclosure, and are electrically connectable to each other through a connector.

11. The storage system of claim 10, wherein:
    the first power control circuit is mounted on the management circuit; and
    the second power control circuit is mounted on the interface circuit.

12. The storage system of claim 11, wherein the first power control circuit mounted on the management circuit is configured to transmit the second control signal to the power controlled circuit, and to transmit a clock signal to the second power control circuit mounted on the interface circuit to cause the second power control circuit to latch the first control signal.

13. The storage system of claim 12, wherein:
    the first power control circuit mounted on the management circuit is configured to transmit the clock signal to the second power control circuit mounted on the interface circuit; and
    the second power control circuit mounted on the interface circuit is configured to latch the first control signal at a predetermined timing of the transmitted clock signal.

14. The storage system of claim 11, further comprising a power supply configured to supply a predetermined power voltage to the first power control circuit mounted on the management circuit, the second power control circuit mounted on the interface circuit, and the power controlled circuit,
    wherein the power controlled circuit is mounted on the power supply.

15. The storage system of claim 11, further comprising:
    a power supply configured to supply a predetermined power voltage to the first power control circuit mounted on the management circuit, the second power control circuit mounted on the interface circuit and the power controlled circuit; and
    an auxiliary power supply configured to receive power voltage supplied from the power supply, and to accumulate power, the auxiliary power supply supplying an auxiliary power voltage to each of the circuits if the storage system is electrically disconnected from an external power source, wherein the power controlled circuit is mounted on the auxiliary power supply unit.

16. The storage system of claim 11, wherein the first power control circuit mounted on the management circuit is replaceable with a power control circuit including a similar structure or function for an online period of the storage system.

17. The storage system of claim 11, further comprising a redundant power control circuit including a structure similar to the structure of the second power control circuit, wherein:
the interface circuit is constituted of redundant first and second modules;
the first module corresponds to an odd group of the memory,
the second module corresponds to an even group of the memory,
the second power control circuit is mounted on the first module; and
the redundant power control circuit is mounted on the second module.

18. The storage system of claim 17, wherein the second power control circuit and the redundant power control circuit are replaceable with a power control circuit including a similar structure or function for an online period of the storage system.

19. A storage system comprising:
a first control circuit configured to generate a control signal that controls a controlled circuit, to output a first control signal based on the generated control signal, and to output a second control signal based on the generated control signal; and
a second control circuit configured to latch the first control signal received from the first control circuit, and to output the latched first control signal as a third control signal, wherein:
a fourth control signal is supplied to the controlled circuit, which fourth control signal is a signal of OR logic formed by connecting the second control signal output from the first control circuit and the third control signal output from the second control circuit; and
the first control circuit is detachable from the storage system during a period of time where the storage system operates.

\* \* \* \* \*